US006810423B1

(12) United States Patent
Gonno et al.

(10) Patent No.: US 6,810,423 B1
(45) Date of Patent: Oct. 26, 2004

(54) COMMUNICATION SYSTEM

(75) Inventors: Yoshihisa Gonno, Kanagawa (JP); Fumihiko Nishio, Tokyo (JP); Kazuo Haraoka, Tokyo (JP); Yasuaki Yamagishi, Kanagawa (JP)

(73) Assignees: Sony Corporation, Tokyo (JP); Information Broadcasting Laboratories, Inc., Tokyo (JP)

( * ) Notice: Subject to any disclaimer, the term of this patent is extended or adjusted under 35 U.S.C. 154(b) by 0 days.

(21) Appl. No.: 09/445,804

(22) PCT Filed: Apr. 23, 1999

(86) PCT No.: PCT/JP99/02187
§ 371 (c)(1),
(2), (4) Date: Jan. 20, 2000

(87) PCT Pub. No.: WO99/56438
PCT Pub. Date: Nov. 4, 1999

(30) Foreign Application Priority Data

Apr. 24, 1998 (JP) .......................................... P10-114798
Apr. 16, 1999 (JP) .......................................... P11-108825

(51) Int. Cl.$^7$ ............................................... G06F 15/16
(52) U.S. Cl. ...................... 709/229; 709/226; 709/217; 709/203
(58) Field of Search ................................. 709/229, 217, 709/203, 231, 226; 348/731, 389; 395/200

(56) References Cited

U.S. PATENT DOCUMENTS

| 5,583,576 A | * | 12/1996 | Perlman et al. ................ 725/28 |
| 5,666,645 A | * | 9/1997 | Thomas et al. ................ 725/47 |
| 5,699,355 A | * | 12/1997 | Natarajan .................... 370/322 |
| 5,822,530 A | * | 10/1998 | Brown .......................... 725/96 |
| 5,872,588 A | * | 2/1999 | Aras et al. ..................... 725/14 |
| 5,983,261 A | * | 11/1999 | Riddle .......................... 709/204 |
| 6,014,184 A | * | 1/2000 | Knee et al. ..................... 725/45 |
| 6,021,433 A | * | 2/2000 | Payne et al. ................. 709/219 |
| 6,038,601 A | * | 3/2000 | Lambert et al. ............. 709/226 |
| 6,108,706 A | * | 8/2000 | Birdwell et al. ............. 709/229 |
| 6,115,747 A | * | 9/2000 | Billings et al. ............. 709/231 |
| 6,134,596 A | * | 10/2000 | Bolosky et al. ............. 709/233 |
| 6,370,571 B1 | * | 4/2002 | Medin, Jr. ................... 709/218 |
| 6,377,561 B1 | * | 4/2002 | Black et al. ................ 370/330 |

FOREIGN PATENT DOCUMENTS

| JP | 8-140081 | 5/1996 | .......... H04N/7/173 |
| JP | 9-284748 | 10/1997 | .......... H04N/7/173 |
| JP | 10-303983 | 11/1998 | .......... H04N/12/56 |

* cited by examiner

Primary Examiner—David Wiley
Assistant Examiner—Phuoc Nguyen
(74) Attorney, Agent, or Firm—Sonnenschein, Nath & Rosenthal LLP

(57) ABSTRACT

At a server 2, a subject for updating an object registered in a database 3 and an event for obtaining the subject are generated, while a request for the subject from a receiving terminal 5 is received and totaled so that a resource necessary for providing the subject is allocated on the basis of the result of totaling. Then, the event is transmitted and the subject is provided on the basis of the resource allocated thereto. At the receiving terminal 5, the event is received and the necessity of the subject to be obtained on the basis of the event is evaluated so that request data requesting the subject is transmitted to the server 2 on the basis of the result of evaluation. Then, the subject provided by the server 2 in response to the request data is obtained on the basis of the event.

6 Claims, 14 Drawing Sheets

| DESIGNATION OF BROADCASTING DAY | REQUEST LEVEL |
|---|---|
| WITHIN 1 DAY | 5 |
| 3 DAYS | 4 |
| 1 WEEK | 3 |
| 2 WEEKS | 2 |
| 1 MONTH | 1 |

FIG.2

| RESOURCE ALLOCATION | SUBJECT S1 | SUBJECT S2 |
|---|---|---|
| BANDWIDTH | 1Mbps | 2Mbps |
| TRANSMISSION FREQUENCY | ONCE/ 30 MINUTES | ONCE/ 5 MINUTES |
| DURATION | ALL DAY | ALL DAY |

FIG.3A

| RESOURCE ALLOCATION | SUBJECT S1 | SUBJECT S2 |
|---|---|---|
| BANDWIDTH | 2Mbps | 1Mbps |
| TRANSMISSION FREQUENCY | ONCE/ 10 MINUTES | ONCE/ 10 MINUTES |
| DURATION | 2 HOURS | 2 HOURS |

| ID | VERSION INFORMATION | DISCRIMINATION FLAG | BROADCASTING SCHEDULE INFORMATION |

FIG.11B

| ID | VERSION INFORMATION | DISCRIMINATION FLAG | SERVER ACCESS INFORMATION |

FIG.11C

| ID | VERSION INFORMATION | DISCRIMINATION FLAG | BROADCASTING SCHEDULE INFORMATION | SERVER ACCESS INFORMATION |

COMMUNICATION SYSTEM

DESCRIPTION

1. Technical Field

This invention relates to a contents providing device, a contents providing method, a receiving device, a receiving method, a communication system, and a communication method, and particularly to a contents providing device, a contents providing method, a receiving device, a receiving method, a communication system, and a communication method which are suitably used in the case where data is to be distributed to a number of databases constituting distributed databases, the case where data is to be distributed by IP (Internet Protocol) multicast, and the case where data is to be distributed to a number of unspecified parties.

2. Background Art

Various techniques have been proposed as data distribution techniques. For example, on the present Internet, a protocol based on TCP/IP (Transmission Control Protocol/Internet Protocol) such as HTTP (Hyper Text Transfer Protocol) is employed. In accordance with the TCP/IP, calling to the data transmission side is carried out on the receiving side where distribution of data is received, and connection between the transmission side and the receiving side is established every time data transmission/reception is carried out. Therefore, highly reliable distribution of data can be carried out. However, the load on the transmission side and network is increased, and therefore, in some cases it is difficult to carry out efficient data distribution.

Specifically, if the number of terminals which receive provided data is increased and access to the server providing data is concentrated, a very large load is applied on the server and network, and it takes quite a long time to obtain data after requesting the data.

Thus, there is recently proposed a technique of DRP (Distribution and Replication Protocol) in W3C (World Wide Web Consortium). In accordance with the DRP, in the case where data is updated in one database, only differential information between the data before updating and the updated data is individually distributed to other databases dispersed in a number of regions, instead of distributing the updated data itself. Then, in the database where the distribution of the differential information is received, the data before updating is updated on the basis of the differential information.

Therefore, since the differential information is transmitted in the data distribution method using the DRP, the quantity of information flowing on the network can be reduced in comparison with the case where the data itself is transmitted. However, if access from a large number of terminals is concentrated, the load on the server and network is increased, making it difficult to carry out efficient data distribution.

In the data distribution using the TCP/IP or DRP as described above, connection between the transmission side and receiving side is established so that data is transmitted and received. On the other hand, there is data distribution method using UDP (User Datagram Protocol) such as IP (Internet Protocol) multicast for carrying out connectionless transmission/reception of data. Since the data distribution using the UDP is connectionless data distribution, the reliability of data is lowered in comparison with the data distribution using the TCP/IP or the like based on the established connection, but the load on the transmission side and network can be reduced.

However, even in the case of the UDP, data must be distributed individually to each of many terminals as long as the present Internet is used. Therefore, even when data distribution from the server is automatically carried out, the increase in the number of terminals increases the load on the server and network, making it difficult to carry out efficient data distribution.

In any of the above-described data distribution methods, the increase in the load on the server and network due to the increase in the number of terminals cannot be avoided in the case where data distribution is carried out via the Internet connected by physical lines such as cables.

Thus, there is proposed a method for data distribution using a satellite circuit or a ground-wave program circuit of a broad frequency band which enables simultaneous multiple address over a wide region. In this case, the load on the server and network is not influenced by the increase in the number of terminals.

Meanwhile, in simultaneous data distribution using a satellite circuit or the like, the same data is distributed to each user. However, when certain data is distributed, not all users want that data. That is, when data distribution to an extremely large number of users is carried out, it is typical that some users want that data while others do not. Since data to be distributed is generally determined on the transmission side, distribution of data demanded by a small number of users might be preferentially carried out rather than distribution of data demanded by a large number of users. Such a case is not preferred in consideration of efficient data distribution.

Moreover, in simultaneous multiple address of data using a satellite circuit, a certain user who immediately needs certain data might not be provided with that data immediately. It is difficult to deal with such a case.

DISCLOSURE OF THE INVENTION

In view of the foregoing status of the art, it is an object of the present invention to enable more efficient distribution of data demanded by users.

According to the present invention, in a contents providing device, request signals transmitted from a plurality of contents receiving devices are received and totaled, and a resource for providing a contents signal is allocated on the basis of the result of totaling of the request signals. Then, the contents signal is provided to the plurality of contents receiving devices on the basis of the allocated resource. On the other hand, in each of the plurality of contents receiving devices, the necessity of the contents signal is evaluated, and a request signal for receiving the contents signal to be provided is generated on the basis of the result of evaluation. Then, the request signal is transmitted to the contents providing device, and the content signals provided from the contents providing device is obtained.

That is, according to the present invention, there is provided a communication system comprising a contents providing device for providing a contents signal and a plurality of contents receiving devices for receiving the contents signal provided from the contents providing device. The contents providing device includes receiving means for receiving request signals transmitted from the plurality of contents receiving devices, totaling means for totaling the request signals received by the receiving means, resource allocation means for allocating a resource for providing the contents signal on the basis of the result of totaling by the totaling means, and contents providing means for providing the contents signal to the plurality of contents receiving devices on the basis of the resource allocated by the resource allocation means. The contents receiving device includes request signal generation means for evaluating the necessity of the contents signal and generating a request signal for receiving the contents signal on the basis of the result of evaluation, request signal transmission means for transmitting the request signal to the contents providing device, and contents obtaining means for obtaining the contents signal provided by the contents providing means of the contents providing device.

According to the present invention, there is also provided a communication method in a communication system comprising a contents providing device for providing a contents signal and a plurality of contents receiving devices for receiving the contents signal provided from the contents providing device. On the side of the contents receiving device, the necessity of the contents signal is evaluated, and a request signal for receiving the contents signal is generated on the basis of the result of evaluation. Then, the generated request signal is transmitted to the contents providing device. On the side of the contents providing device, the request signals transmitted from the plurality of contents receiving devices are received, and a resource for providing the contents signal is allocated on the basis of the result of totaling of the received request signals. Then, the contents signal is provided to the plurality of contents receiving devices on the basis of the allocated resource, and the contents signal provided from the contents providing device is obtained on the side of the contents receiving device.

According to the present invention, there is also provided a contents providing device for supplying a contents signal to a plurality of contents receiving devices. The contents providing device includes receiving means for receiving request signals transmitted from the plurality of contents receiving devices, totaling means for totaling the request signal received by the receiving means, resource allocation means for allocating a resource for providing the contents signal on the basis of the result of totaling by the totaling means, and contents providing means for providing the contents signal to the plurality of contents receiving devices on the basis of the resource allocated by the resource allocation means.

According to the present invention, there is also provided a contents providing method for providing a contents signal to a plurality of contents receiving devices. The method includes the steps of receiving request signals transmitted from the plurality of contents receiving devices, totaling the received request signals, allocating a resource for providing the contents signal on the basis of the result of totaling of the request signals, and providing the contents signal to the plurality of contents receiving devices on the basis of the allocated resource.

According to the present invention, there is also provided a contents receiving device for receiving a contents signal provided from a contents providing device for supplying the contents signal. The content receiving device includes request signal generation means for evaluating the necessity of the contents signal and generating a request signal for receiving the contents signal on the basis of the result of evaluation, request signal transmission means for transmitting the request signal to the contents providing device, and contents obtaining means for obtaining the contents signal provided by contents providing means of the contents providing device.

According to the present invention, there is also provided a contents receiving method for receiving a contents signal provided from a contents providing device for supplying the contents signal. The method includes a request signal generation step of evaluating the necessity of the contents signal and generating a request signal for receiving the contents signal on the basis of the result of evaluation, a request signal transmission step of transmitting the request signal to the contents providing device, and an obtaining step of obtaining the contents signal provided by the contents providing device.

BRIEF DESCRIPTION OF THE DRAWINGS

FIG. 2 shows a request level calculation table.

FIGS. 3A and 3B illustrate a change of resource allocation.

FIGS. 11A, 11B and 11C show the format of event in the data distribution system.

BEST MODE FOR CARRYING OUT THE INVENTION

A preferred embodiment of the present invention will now be described in detail with reference to the drawings.

Figure 1:
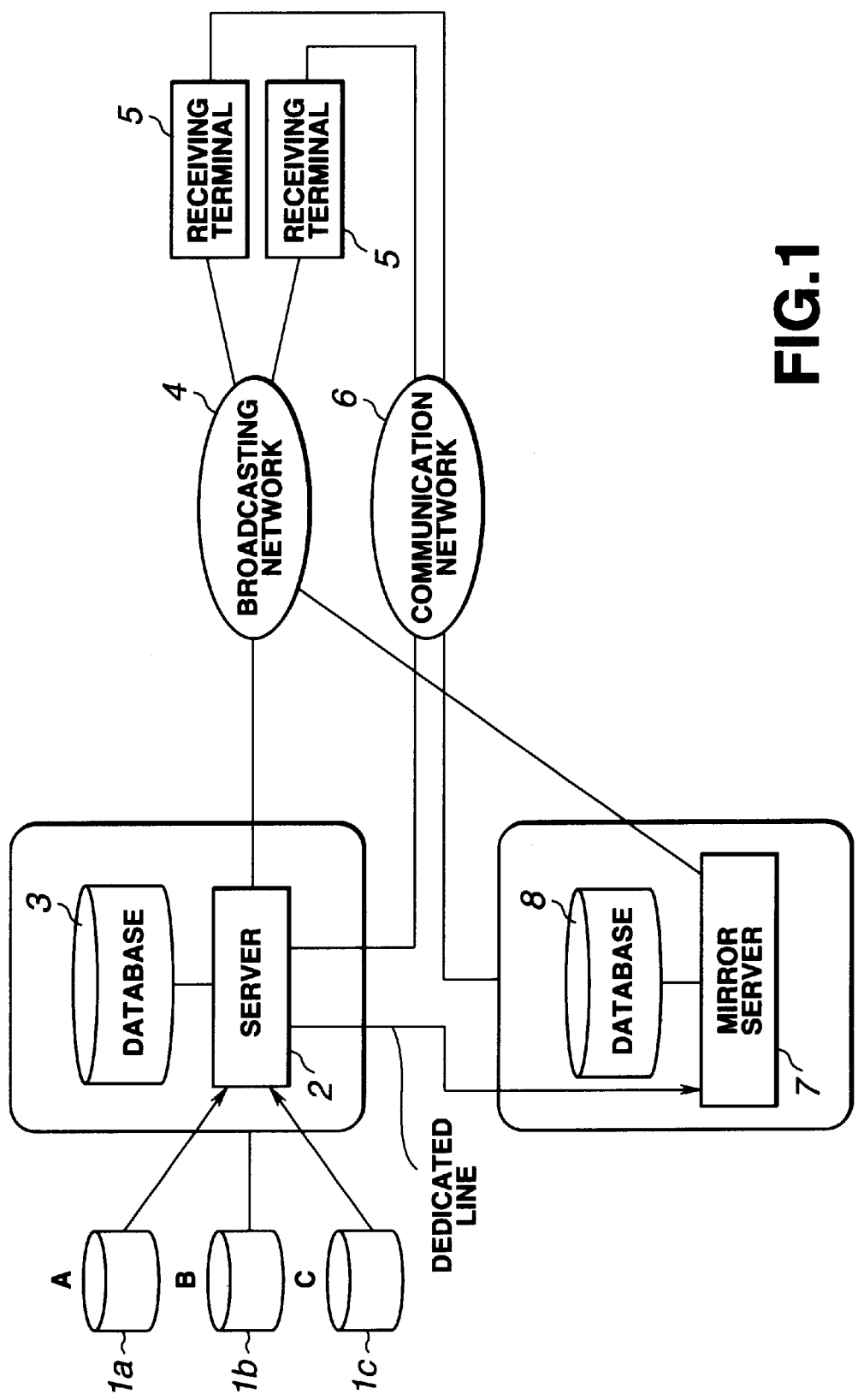
FIG. 1 shows a exemplary structure of a data distribution system as an embodiment of the present invention.

FIG. 1 shows an exemplary structure of a data distribution system as an embodiment of the present invention.

Information providers A to C have databases $1a$ to $1c$ in which various data are stored. It is possible to store, in the databases $1a$ to $1c$, data changed in real time such as traffic information, weather information and stock price information, data not changed in real time, text data, image data, audio data, computer programs, and various other data (including structured data provided by point cast and data constituting home pages provided on the WWW (World Wide Web)). Hereinafter, a set of information (e.g., one file) such as traffic information or weather information will be suitably referred to as contents or an object.

When an object (contents) stored in the databases $1a$ to $1c$ is updated, that is, when an object stored in the databases $1a$ to 1c changed, when an object is newly registered thereto, or when an object stored therein is deleted, update object information for carrying out the update is transmitted to a server 2 (contents providing device) constituting a broadcasting station. In the server 2, a database 3 is updated on the basis of the update object information.

When an object is changed, for example, the changed object is transmitted as update object information from the databases 1a to 1c to the server 2. When a new object is registered, for example, the new object is transmitted as update object information from the databases 1a to 1c to the server 2. When an object is deleted, for example, a deletion command for the object is transmitted as update object information from the databases 1a to 1c to the server 2. When an object is changed, the update object information is equal to the changed object. When a new object is registered, the update object information is equal to the new object.

When the registered contents of the database 3 are updated on the basis of the update object information, the server 2 transmits the update object information to a mirror server 7, for example, through a communication network 6 as a network enabling bidirectional communication such as an analog public network, ISDN (Integrated Services Digital Network), the Internet and the like, or a dedicated line. The mirror server 7 receives the update object information from the server 2 and updates a database 8 on the basis of the update object information. Therefore, the registered contents of the databases 3 and 8 are basically the same.

In addition, when the registered contents of the database 3 are updated, the server 2 generates data (hereinafter suitably referred to as a subject) (update data) by adding an identifier (identification information) for identifying the object to be updated by the update object information to the update object information. Specifically, identifiers for identifying the respective objects are associated with the objects stored in the database 3, and a subject is generated by adding the identifier of the object to be updated by the update object information to the update object information.

The server 2 also generates data for obtaining a subject. Specifically, a subject may be transmitted from the server 2 through a broadcasting network 4, as will be later described. In this case, information on the time and channel of broadcast of the subject is necessary for obtaining the subject. Also, the subject may be associated with a URL (uniform resource locator) and managed by the server 2 or the mirror server 7, as will be later described. In this case, the URL (or domain name of the server 2 or the mirror server 7) and the transfer protocol of the subject are necessary for obtaining the subject. Thus, in the server 2, information related to a so-called subject obtaining method is generated as the data for obtaining the subject.

Moreover, the server 2 generates data (hereinafter suitably referred to as event) (obtaining data) by adding, to the data for obtaining the subject, the identifier of the object to be updated by the subject obtained on the basis of the data.

When the subject and the event for obtaining the subject are generated in the server 2, the subject and the event are transmitted to a receiving terminal 5 constituted by, for example, an IRD (integrated receiver and decoder) or a STB (set top box) through the broadcasting network 4 as a unidirectional (or bidirectional) network enabling simultaneous multiple address for a large number of users such as a satellite circuit, a CATV network, ground waves, IP multicast and the like in accordance with the transmission schedule.

Specifically, when the subject is generated and then the event for obtaining the subject (event to which the same identifier as that of the subject is added) is generated, basically, the event is first transmitted through the broadcasting network 4. If the broadcasting time and channel of the subject are described in the event thus transmitted, the subject is transmitted through the broadcasting network 4 at that broadcasting time on that channel.

In the server 2, the transmission schedule of the subject is first determined. (That is, the subject obtaining method including the broadcasting time and the broadcasting channel is determined.) On the basis of the transmission schedule, the broadcasting time and the broadcasting channel of the subject are described in the event. Then, the transmission schedule of the event is determined.

In the case where the subject is associated with the URL and managed by the server 2 or the mirror server 7, an event including the URL and the like is generated and transmitted through the broadcasting network 4. That is, in the case where the subject is managed by the server 2 or the mirror server 7, the event including the URL (subject obtaining method) having the IP address of the server 2 or the mirror server 7 as the domain name is generated and transmitted.

The event thus transmitted (distributed) through the broadcasting network 4 is received by the receiving terminal 5 of the user. The receiving terminal 5 selects an event related to an object demanded by the user from among the received events and obtains the subject on the basis of the selected event.

For example, in the case where the broadcasting time and channel of the subject is included in the event, the receiving terminal 5 receives the subject transmitted from the server 2 through the broadcasting network 4 at that broadcasting time on that broadcasting channel, as described above.

In the case where the URL associated with the subject is included in the event, the receiving terminal 5 accesses the server corresponding to the domain name of the URL through the communication network 6, and then requests and receives the subject.

Specifically, if the server corresponding to the domain name of the URL included in the event is the server 2, the subject is managed by the server 2. Therefore, the receiving terminal 5 accesses the server 2 through the communication network 6 and obtains the subject.

On the other hand, if the server corresponding to the domain name of the URL included in the event is the mirror server 7, the subject is managed by the mirror server 7. Therefore, the receiving terminal 5 accesses the mirror server 7 through the communication network 6 and obtains the subject.

The receiving terminal 5 thus obtains the subject and updates the object on the basis of the subject.

The subject is transmitted from the server 2 through the broadcasting network 4 and may be managed by the server 2 or the mirror server 7. Although one mirror server 7 is shown in the embodiment of FIG. 1, a plurality of mirror servers (contents providing devices) for carrying out processing similar to that of the mirror server 7 can be provided on the communication network 6. In this case, the subject can be managed by the plurality of mirror servers. Also, the subject may be transmitted from the server 2 through the broadcasting network 4 on a plurality of channels or at a plurality of times, instead of transmission on a given channel at a given time.

As described above, if there are a plurality of subject obtaining methods, information (broadcasting time, broadcasting channel, URL, etc.) about each of the plurality of methods is included in the event. However, which method should be employed for obtaining the subject is determined at the receiving terminal 5. For example, if a plurality of times for transmitting the subject through the broadcasting network 4 are included in the event, the receiving terminal 5 receives the subject broadcast at the time nearest to the current time, thus obtaining the subject. On the other hand, if a plurality of URLs are included in the event, the URL of the server closest to the receiving terminal 5 is selected and the subject is requested to that server through the communication network 6, thus obtaining the subject. Moreover, if the time for transmitting the subject through the broadcasting network 4 and the URL are included in the event, for example, the subject is obtained on the basis of the URL as described above when the circuit state of the broadcasting network 4 is not good (e.g., the S/N (signal-to-noise) ratio is low). Which method should be used for obtaining the subject can also be determined on the basis of the operation by the user at the receiving terminal 5.

According to the data distribution system as described above, the event in which the subject obtaining method is described is distributed through the broadcasting network 4. At the receiving terminal 5, the subject is obtained and the object is updated on the basis of the event. Therefore, it is possible to carry out efficient data distribution while restraining the increase in the load on the receiving terminal 5.

That is, in general, the subject including the update object information for updating the object (particularly for change and new registration of object) has a large data quantity, and when the subject will be generated is not known since the subject is generated in accordance with the update of the object. Therefore, in order to transmit only the subject generated irregularly and having a large data quantity through the broadcasting network 4 as early as possible, the server 2 must transmit the subject by using a channel that is not occupied at the present time point. In this case, however, the receiving terminal 5 must wait for the subject with unknown transmission time and channel and therefore receives a large burden.

On the contrary, since the event includes description of the subject obtaining method, the data quantity of the event is generally much smaller than the subject including the update object information. Therefore, it is possible to carry out transmission according to the predetermined transmission schedule, that is, to carry out transmission on a given narrow-band channel and at a given time. Thus, in this case, the receiving terminal 5 only needs to receive the event transmitted on the given channel at the given time, and the load on the receiving terminal 5 is much smaller than in the case where it waits for a subject irregularly transmitted on an arbitrary channel.

Moreover, in this embodiment, since the event is transmitted through the broadcasting network 4 which enables simultaneous multiple address over a broad region, the increase in the number of receiving terminals 5 does not affect the load on the server 2 or the broadcasting network 4.

In this embodiment, since the subject can be provided not only through the communication network 6 but also through the broadcasting network 4, accesses to the server 2 or the mirror server 7 are rarely concentrated for obtaining the subject, thus enabling efficient distribution of the subject.

The broadcasting network 4 and the communication network 6 need not be physically different networks. That is, in the case where the broadcasting network 4 is constituted by a CATV network, the CATV network can also be used as the communication network 6. Also, in the case where distribution of data through the broadcasting network 4 is carried out by IP (Internet Protocol) multicast utilizing the Internet or the like, the communication network 6 can be constituted by the Internet.

In addition, by scrambling the data (event and subject) transmitted from the server 2 to the receiving terminal 5, it is possible to enable only specified users (users who made a contract for reception) to receive the data.

The mirror server 7 receives the update object information from the server 2, then constitutes the event and subject similarly to the server 2, and provides the event and subject to the receiving terminal 5.

Hereinafter, the transmission of the event, subject and other data through the broadcasting network 4 is suitably referred to as multiple-address transmission. The transmission of the subject and other data through the communication network 6 is referred to as individual transmission.

Meanwhile, by receiving the event at the receiving terminal 5, the subject obtaining method corresponding to the event, that is, the broadcasting channel and the broadcasting time of multiple-address transmission of the subject and the server to which individual transmission of the subject should be requested can be recognized. Therefore, in the case where the subject is immediately required at the receiving terminal 5 while the broadcasting time of multiple-address transmission of the subject is not reached yet, the receiving terminal 5 can immediately obtain the subject by requesting the subject by individual transmission. In this case, however, if there are a large number of receiving terminals immediately requiring the subject, the load on the server 2 or the mirror server 7b to which individual transmission is requested is increased.

Moreover, if there are a large number of receiving terminals immediately requiring the subject, it is more preferred to provide the subject by multiple-address transmission enabling simultaneous multiple address than to provide the subject by individual transmission, in view of the efficient distribution of data.

Also, the subject is not necessarily provided both by multiple-address transmission and by individual transmission. In some cases, for example, the subject is provided only by individual transmission. However, if there are a large number of receiving terminals requiring the subject, it is more preferred to provide the subject by multiple-address transmission, in view of the efficient distribution of data.

Furthermore, if there are a large number of receiving terminals requiring the subject, the subject can be distributed more efficiently by allocating a broader transmission band (a higher data rate) than that of other subjects for multi-address communication of the subject.

Thus, in the data distribution system of FIG. 1, on receiving the event, the receiving terminal 5 evaluates the necessity of the subject obtained on the basis of the event. When the subject is immediately needed, request data for requesting the subject is transmitted to the server 2 (or mirror server 7) by individual transmission.

For example, in the case where the user carried out operation to request the subject, the receiving terminal 5 evaluates the subject as being needed. Also, the effective period and importance of the object can be designated by the information providers A to C and the users. In the case where the effective period of the object has expired or in the case where the object has high importance, the receiving terminal 5 can evaluates the necessity of the subject for updating the object as being high.

On the other hand, the server 2 totals request data from the receiving terminal 5 and other receiving terminals, and changes the transmission schedule, for example, by advancing the broadcasting time of the subject, or changes resource allocation for transmission of the subject, for example, by increasing the number of times of broadcast or allocating a broader transmission band, on the basis of the totaling result.

The request data transmitted from the receiving terminal 5 to the server 2 includes the designation of broadcasting data expressing by what time the subject should be transmitted, as will be later described. On receiving the request data, the server 2 carries out totaling of the request data for finding the overall degree of request (hereinafter suitably referred to as general degree of request) on the receiving side with respect to the subject requested by the request data, on the basis of the designation of broadcasting date included in the request data.

Specifically, the server 2 converts the designation of broadcasting date included in the request data to the request level of the subject requested by the request data, on the basis of a request level calculation table as shown in FIG. 2. Moreover, the server 2 calculates the sum of request levels obtained from the request data receiving during a predetermined period of time, as the general degree of request. For example, in the case where request data including the designation of broadcasting date of "within one day" or "within three days" is to be received for 2200 or 1000, 2000×5+1000×4=15000 is found as the general degree of request in accordance with the request level calculation table of FIG. 2.

Then, the server 2 changes the transmission schedule, resource allocation and the like on the basis of the general degree of request. For example, the server 2 changes the broadcasting data by multiplying the number of days until the broadcasting date for transmitting the subject for which the general degree of request is calculated, by 10000/general degree of request. Specifically, in the case where a general degree of request equal to 15000 is obtained with respect to a certain subject as described above and the number of days until the broadcasting date is 6, the broadcasting data is changed to four days from the present day in accordance with 6×10000/15000=4. In this case, with respect to the subject for which the general degree of request equal to 15000 is obtained, the degree of request is recognized as being high and the broadcasting data is advanced from six days from the present day to four days from the present day.

Meanwhile, it is assumed that resource for transmitting subjects S1 and S2 are allocated as shown in FIG. 3A by the server 2. For the subject S1, a bandwidth of 1 Mbps (bandwidth of the broadcasting network 4) is allocated. The transmission frequency of the subject S1 is once every 30 minutes and the transmission is to be carried out all day long. For the subject S2, a bandwidth of 2 Mbps is allocated. The transmission frequency of the subject S2 is once every five minutes and the transmission is to be carried out all day long.

It is now assumed that in the case where resource allocation as described above is done, a high general degree of request is obtained for the subject S1 while a low general degree of request is obtained for the subject S2. In this case, the server 2 changes the resource allocation of FIG. 3A to resource allocation as shown in FIG. 3B. In FIG. 3B, a bandwidth of 2 Mbps is allocated for the subject S1 having a high general degree of request. The transmission frequency of the subject S1 is once every 10 minutes and the transmission is to be carried out only for two hours. For the subject S2 having a low general degree of request, and bandwidth of 1 Mbps is allocated. The transmission frequency of the subject S2 is once every 10 minutes and the transmission to be carried out only for two hours. Thus, the resource allocation is changed so that more resources than the first allocated resources are allocated for the subject S1 having a high general degree of request. With respect to the subject S2 having a low general degree of request, the server 2 changes the resource allocation so that less resources than the first allocated resources are allocated.

Figure 4A:
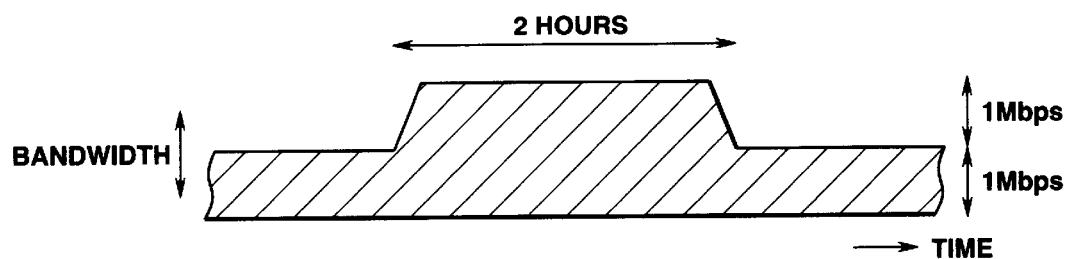
FIGS. 4A and 4B show a change of bandwidth.
Figure 4B:
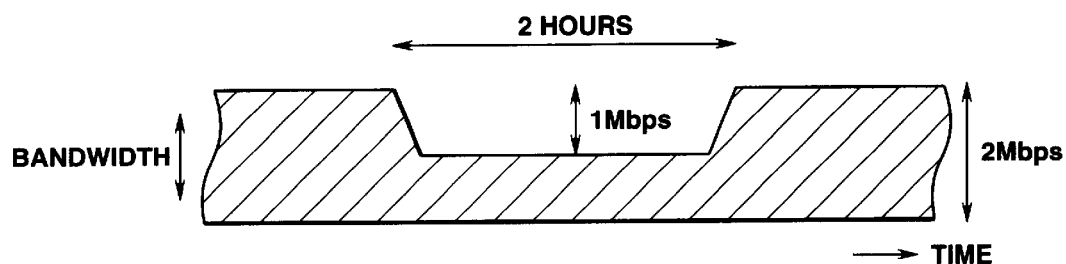

The bandwidth in the resource allocation shown in FIGS. 3A and 3B will now be described. The subject S1 is first transmitted at 1 Mbps as shown in FIG. 4A, and then transmitted at 2 Mbps in accordance with the change of resource allocation described with reference to FIGS. 3A and 3B. After the lapse of two hours from the start of the transmission at 2 Mbps, the subject S1 is transmitted again at 1 Mbps. On the other hand, the subject S2 is first transmitted at 2 Mbps as shown in FIG. 4B, and then transmitted at 1 Mbps in accordance with the change of resource allocation described with reference to FIGS. 3A and 3B. After the lapse of two hours from the start of the transmission at 1 Mbps, the subject S2 is transmitted again at 2 Mbps.

In this manner, since the server 2 preferentially transmits the subject of higher demand (request), the subject can be efficiently distributed.

Figure 5:
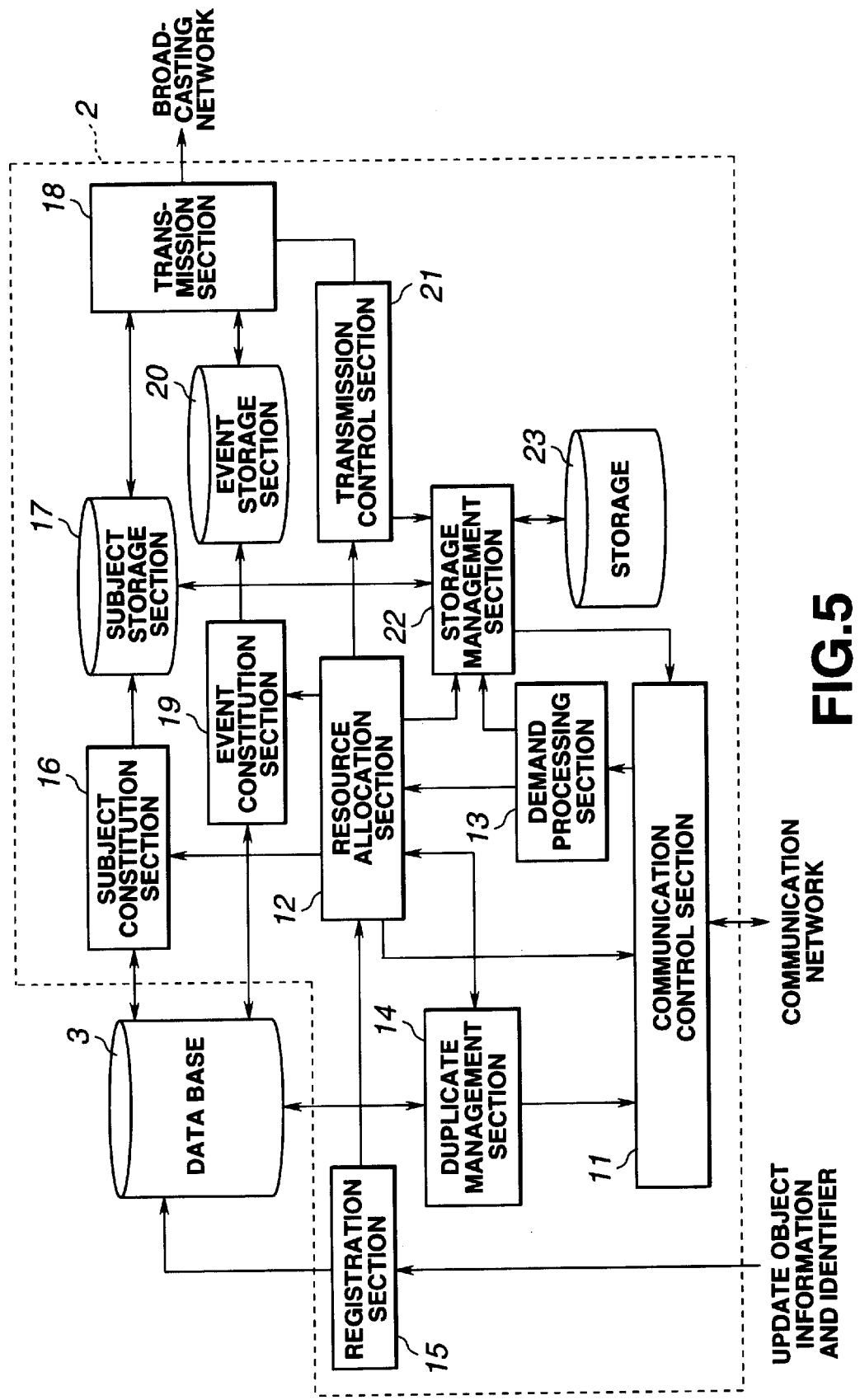
FIG. 5 is a block diagram showing an exemplary structure of a server in the data distribution system of FIG. 1.

FIG. 5 shows an exemplary structure of the server 2 of FIG. 1.

A communication control section 11 is constituted by a modem or a terminal adapter (TA), and controls the communication (individual transmission) through the communication network 6. A resource allocation section 12 carries out resource allocation for multi-address communication of the event and subject and resource allocation for individual transmission of the subject.

Specifically, the resource allocation section 12 receives a notice of update of the object from a registration section 15, then allocates resources for transmitting the event and subject through the broadcasting network 4 (for example, the transmission band (data rate) for multiple-address transmission of the event and object, the number of times of transmission (transmission frequency), and the time for each block constituting the server 2 to carry out processing for multiple-address transmission) in accordance with the update, and furthermore determines the transmission schedule (for example, the broadcasting channel, broadcasting time and the like).

The resource allocation section 12 also allocates resources for providing the subject by individual transmission (for example, the recording area of a storage 23 which will be later described).

In the resource allocation section 12, allocation of resources is carried out on the basis of information from a demand processing section 13. The result of allocation of resources for transmission of the event and subject and the transmission schedule determined by resource allocation section 12 are supplied to a subject constitution section 16, an event constitution section 19, a transmission control section 21, and a storage management section 22. The resource allocation section 12 also controls a duplicate management section 14.

The demand processing section 13 receives, through the communication control section 11, the audience rating of the object and the request data transmitted from the receiving terminal 5 through the communication network 6, and carries out totaling of the data. The demand processing section 13 supplies the result of totaling to the resource allocation section 12. On receiving the request data, and demand processing section 13 controls the storage management section 22, if necessary, so that the subject requested by the request data is read out from the storage 23.

The duplicate management section 14 manages information for specifying the mirror server 7 (and a mirror server, not shown, on the communication network 6). Specifically, in the case where the communication network 6 is the Internet, the duplicate management section 14 stores the IP address of the mirror server 7 and the like. Under the control of the resource allocation section 12, the duplicate management section 14 reads out the update object information from the database 3 and transmits the update object information through the communication control section 11 to the server, on the communication network 6, having the IP address of the mirror server 7 and the like managed by the duplicate management section 14 itself.

The registration section 15 receives the update object information supplied from the databases 1a to 1c of the information providers A to C and updates the object (database 3) on the basis of the update object information. Specifically, the identifier of the object to be updated by the update object information is supplied together with the update object information from the databases 1a to 1c of the information providers A to C. The registration section 15 receives the update object information and identifier and retrieves the object corresponding to the identifier from the database 3. Moreover, the registration section 15 updates the object, thus retrieved, on the basis of the update object information, and then outputs to the resource allocation section 12 a notice to the effect that the object is updated. The registration section 15 registers the update object information and identifier from the databases 1a to 1c to the database 3.

The subject constitution section 16 reads out the update object information from the database 3 under the control of the resource allocation section 12, then generates (constitutes) a subject in which the update object information is arranged, and supplies the generated subject to a subject storage section 17. The subject storage section 17 temporarily stores the subject from the subject constitution section 16.

A transmission section 18 reads out the subject stored in the subject storage section 17 and the event stored in the event storage section 20 under the control of the transmission control section 21, and transmits the subject and event by multiple-address transmission, that is, through the broadcasting network 4.

The event constitution section 19 generates (constitutes) an event for obtaining the subject constituted by the subject constitution section 16 under the control of the resource allocation section 12 with reference to the database 3, if necessary, and supplies the generated event to the event storage section 20. The event storage section 20 temporarily stores the event from the event constitution section 19. The event generated by the event constitution section 19 includes the broadcasting channel and the broadcasting time of the subject, supplied from the resource allocation section 12, and information related to the server managing the subject, supplied from the duplicate management section 14 through the resource allocation section 12.

The transmission control section 21 controls the transmission section 18 under the control of the resource allocation section 12 so that the event and subject are transmitted by multiple-address transmission. The storage management section 22 reads out the subject that should be transmitted by individual transmission from the subject storage section 17 under the control of the resource allocation section 12 and supplies the subject to the storage 23 so that the subject is stored therein. Moreover, the storage management section 22 reads out the subject stored in the storage 23 under the control of the demand processing section 13 and supplies the subject to the communication control section 11. The storage 23 temporarily stores the subject that should be transmitted by individual transmission, supplied from the storage management section 22.

The mirror server 7 of FIG. 1 (and other servers on the communication network 6) is constituted similarly to the server 2 shown in FIG. 5. However, the duplicate management section 14 is not provided in the mirror server 7. The registration section 15 constituting the mirror server 7 receives the update object information from the server 2 through the communication network 6 or a dedicated line and carries out registration to the database 8.

In the server 2 thus constituted (also in the mirror server 7), registration processing for registering data to the database 3 (or updating registered contents of the database), subject providing processing for providing the subject, event transmission processing for multiple-address transmission of the event, and request data receiving processing with respect to the request data for requesting the subject transmitted from the receiving terminal 5 are carried out.

The registration processing carried out by the server 2 will be first described with reference to the flowchart of FIG. 6.

In the registration processing, first, at step S1, the registration section 15 discriminates whether or not the update object information and identifier are distributed from any of the databases 1a to 1c of the information providers A to C. If it is discriminated that the update object information and identifier are not distributed, the processing returns to step S1. If it is discriminated at step S1 that the update object information and identifier are distributed, the processing goes to step S2, where the registration section 15 adds the identifier to the update object information and then registers the update object information with the identifier to the database 3.

Figure 7:
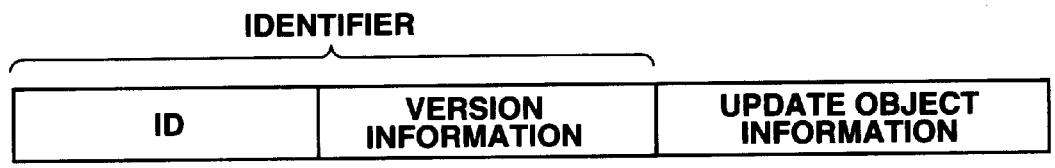
FIG. 7 shows the format of data supplied from a database in the data distribution system.

From the databases 1a to 1c, the update object information and identifier are supplied in the format as shown in FIG. 7.

The identifier includes unique ID (identification) allocated in advance for each of files in which objects of traffic information, weather information, stock price information, and constituent elements of such information are recorded, and version information indicating the newness of the object. For the version information, an integer value making an increment of 1 every time the object is updated is used. Therefore, with respect to objects having the same ID, the latest object can be recognized by comparing the version information. The version information added to the update object information is caused to be a value corresponding to the version after the update of the object which is to be updated by the update object information.

In this case, both the ID and version information have a fixed length. Also, a hash value obtained by calculating a unidirectional hash function on the basis of the object can be used as the ID.

After adding (associating) the identifier distributed from the databases 1a to 1c to the update object information distributed similarly from the databases 1a to 1c, the registration section 15 at step S2 retrieves an object to which an identifier having the same ID as the ID constituting the identifier is added, from the database 3, and updates the object on the basis of the update object information. Then, the registration section 15 makes an increment of 1 on the version information of the identifier added to the updated object. (Alternatively, the registration section 15 copies the version information added to the update object information onto the version information of the identifier added to the updated object.)

After that, at step S3, the registration section 15 outputs to the resource allocation section 12 a notice to the effect that the object is updated, and returns to step S1.

The resource allocation section 12, having received the notice to the effect that the object is updated, recognizes the demand for the object on the basis of the output from the demand processing section 13. On the basis of the result of recognition, the resource allocation section 12 determines a server in which the subject for the updated object should be stored, from among the servers on the communication network 6 including the mirror server 7, managed by the duplicate management section 14. From this server determined as the server in which the subject should be stored (hereinafter suitably referred to as a subject providing server), the subject is provided to the receiving terminal 5. Therefore, the subject providing server can be regarded as a resource for providing the subject. Thus, the determination of the subject providing server can be regarded as resource allocation for providing the subject. The resource allocation is carried out in the subject providing processing of FIG. 8, which will be later described.

After determining the subject providing server, the resource allocation section 12 controls the duplicate management section 14 so as to transmit the update object information for the updated object to the subject providing server. Under the control of the resource allocation section 12, the duplicate management section 14 reads out the update object information registered to the database 3 at step S2 and the identifier added thereto, and transmits the update object information and identifier to the subject providing server through the communication network 6 or a dedicated line.

Figure 6:
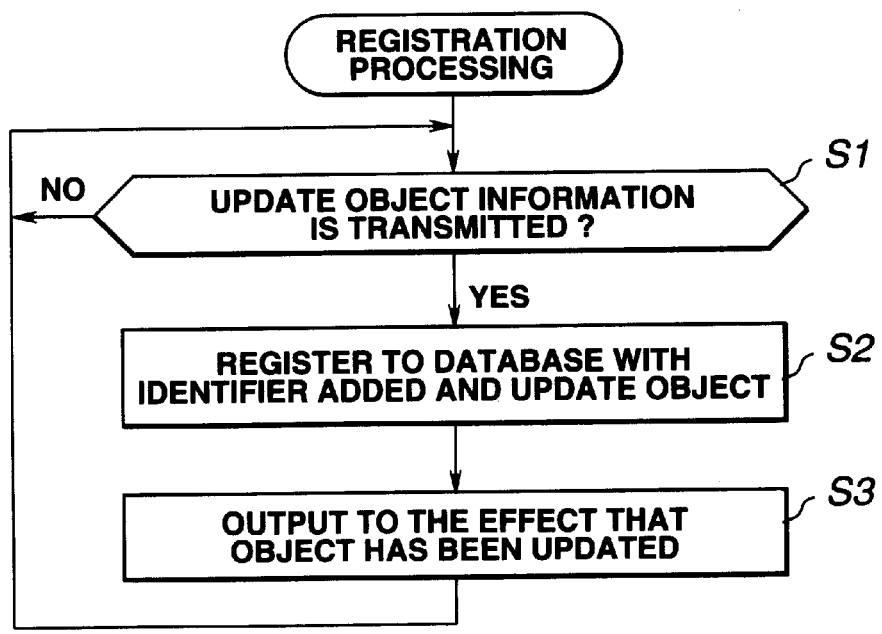
FIG. 6 is a flowchart for explaining registration processing carried out by the server.

The subject providing server, having received the update object information and the identifier added thereto transmitted from the server 2, carries out the registration processing of FIG. 6. Since the server on the communication network 6 except for the server 2 does not have the duplicate management section 14, as described above, distribution of the update information and identifier to other servers is not carried out. However, it is possible to carry out such distribution.

Figure 8:
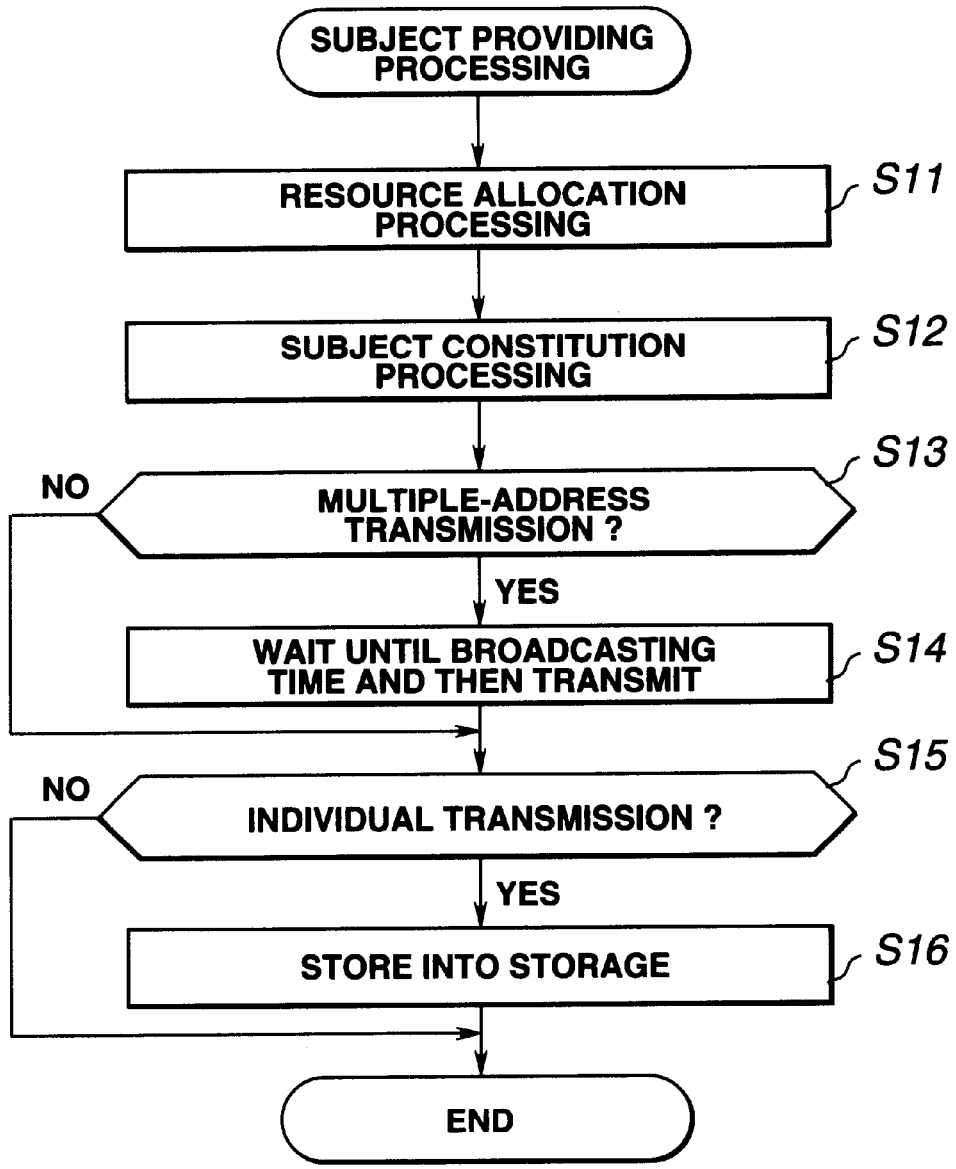
FIG. 8 is a flowchart for explaining subject providing processing carried out by the server.

The subject providing processing carried out by the server 2 will now be described with reference to the flowchart of FIG. 8. The subject providing processing is carried out every time the resource allocation section 12 receives from the registration section 15 the notice to the effect that the object is updated.

In the subject providing processing, first, at step S11, the resource allocation section 12 carries out resource allocation processing. Specifically, at step S11, the subject providing server is determined in the above-described manner. Then, the resource allocation section 12 outputs specification information for specifying the subject providing server, that is, the IP address of the subject providing server, to the event constitution section 19.

Moreover, at step S11, the resource allocation section 12 recognizes the demand for the object for which the notice of update is sent from the registration section 15 (hereinafter suitably referred to as an update target object), on the basis of the output from the demand processing section 13. On the basis of the result of recognition, the resource allocation section 12 determines whether the subject with respect to the object should be provided by individual transmission or not. If the subject is to be provided by individual transmission, resource allocation for securing a recording area (resource) for recording the subject is carried out to the storage 23. Then, the resource allocation section 12 outputs the result of resource allocation (in this case, instruction to secure the recording area for recording the subject) to the storage management section 22.

Also, at step S11, the resource allocation section 12 determines whether the subject with respect to the update target object should be provided by multiple-address transmission or not, on the basis of the result of recognition of the demand for the update target object. If the subject is to be provided by multiple-address transmission, the resource allocation section 12 carries out resource allocation for carrying out multiple-address transmission of the subject on the basis of the result of recognition of the demand for the update target object. That is, the transmission band (data rate) in multiple-address transmission of the subject and the number of times of transmission (transmission frequency) are determined. Moreover, the broadcasting channel and the broadcasting time are also determined as the transmission schedule for multiple-address transmission of the subject. Then, the resource allocation section 12 outputs the result of resource allocation and the transmission schedule to the event constitution section 19 and the transmission control section 21.

Immediately after the registration section 15 notifies the resource allocation section 12 of the update of the object, the demand processing section 13 sets a so-called initial value of the demand for the update target object from the audience rating of the object transmitted from the receiving terminal 5 and the degree of request indicating to what degree the information providers want to provide the object, as will be later described. The initial value is supplied to the resource allocation section 12. Therefore, immediately after the object is updated, the resource allocation section 12 carries out resource allocation and scheduling based on the initial value of the demand for the object. That is, basically, resources are preferentially allocated to a subject having a large general degree of request as described above and a subject for updating an object which the information providers want to provide early. Also, scheduling is carried out so that a subject for updating a recently changed object is transmitted more preferentially.

Hereinafter, the resource allocation and scheduling for transmitting the subject, carried out by the resource allocation section 12, are collectively referred to as resource allocation. (This is because determination of the broadcasting time or the like can be considered as the processing for allocating a resource of time for transmitting the subject.)

Figure 9:
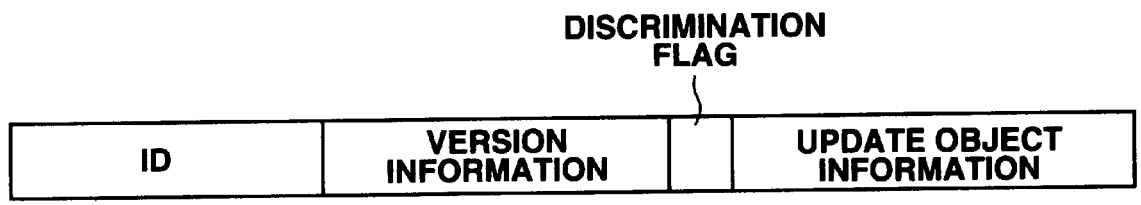
FIG. 9 shows the format of subject in the data distribution system.

On completion of the resource allocation at step S11, the processing goes to step S12, where the subject constitution section 16 constitutes the subject with respect to the update target object. That is, the resource allocation section 12 controls the subject constitution section 16 so as to read out the corresponding update object information and the identifier added thereto from the database 3 and constitute a subject as shown in FIG. 9. In FIG. 9 (also in FIGS. 11A, 11B and 11C as will be later described), a discrimination flag is arranged immediately after the identifier. This discrimination flag expresses whether the data is a subject or an event.

The subject constituted by the subject constitution section 16 is supplied and stored in the subject storage section 17. The processing then goes to step S13, where the transmission control section 21 discriminates whether or not the subject stored in the subject storage section 17 should be transmitted by multiple-address transmission on the basis of the result of resource allocation from the resource allocation section 12. If it is discriminated at step S13 that the subject stored in the subject storage section 17 should be transmitted by multiple-address transmission (that is, if the resource for multiple-address transmission is allocated to the subject), the processing goes to step S14, where the transmission control section 21 waits until the broadcasting time determined by the scheduling for the subject stored in the subject storage section 17 and then controls the transmission section 18 to transmit the subject by multiple-address transmission. Then, the processing goes to step S15.

Thus, the subject is transmitted through the broadcasting network 4 on the basis of the resources (transmission band, number of times of transmission, broadcasting channel, broadcasting time) determined by the resource allocation section 12.

On the other hand, if the transmission control section 21 determines at step S13 that the subject stored in the subject storage section 17 should not be transmitted by multiple-address transmission, step S14 is skipped and the processing goes to step S15. The storage management section 22 determines whether or not the subject stored in the subject storage section 17 should be transmitted by individual transmission on the basis of the result of resource allocation from the resource allocation section 12. If it is determined at step S15 that the subject stored in the subject storage section 17 should be transmitted by individual transmission (that is, if the resource for individual transmission is allocated to the subject), the processing goes to step S16, where the storage management section 22 reads out the subject from the subject storage section 17 and secures a storage area (recording area) in the storage 23 for storing (recording) the subject therein. Then, the subject providing processing ends.

On the other hand, if it is determined at step S15 that the subject stored in the subject storage section 17 should not be transmitted by individual transmission, step S16 is skipped and the subject providing processing ends.

Figure 10:
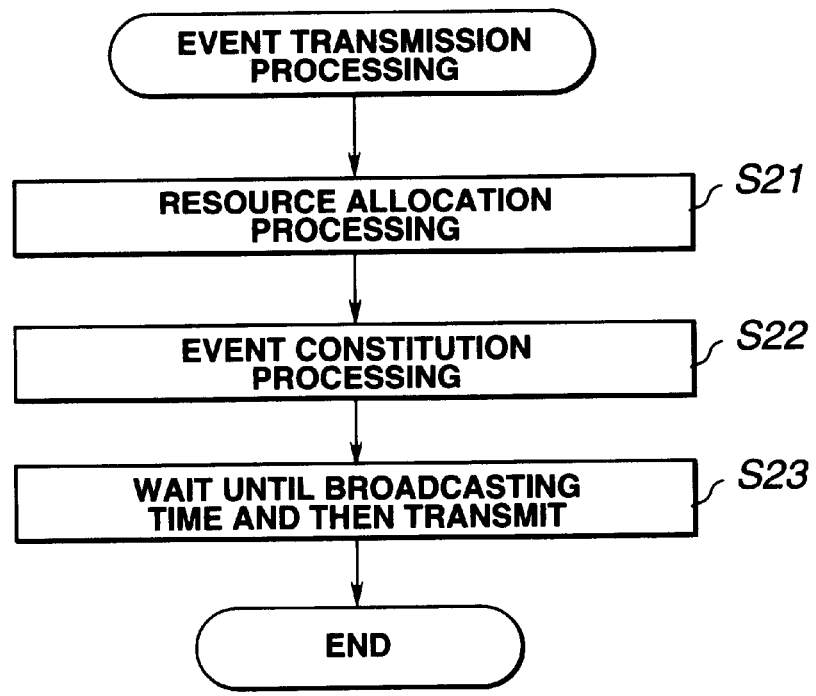
FIG. 10 is a flowchart for explaining event transmission processing carried out by the server.

The event transmission processing will now be described with reference to the flowchart of FIG. 10. The event transmission processing is carried out every time the resource allocation processing of step S11 in the subject providing processing of FIG. 8 is carried out. In the event transmission processing, first, at step S21, the resource allocation section 12 carries out resource allocation processing for multiple-address transmission of an event including the description of the subject obtaining method for the update target object, under the control of the demand processing section 13. Specifically, at step S21, the transmission band (data rate) in the multiple-address transmission of the event and the number of times of transmission (transmission frequency) are determined. The broadcasting channel and the broadcasting time as the transmission schedule for multiple-address transmission of the event are also determined. Then, the resource allocation section 12 outputs the result of resource allocation and the transmission schedule to the transmission control section 21.

Immediately after the registration section 15 notifies the resource allocation section 12 of the update of the object, the demand processing section 13 controls the resource allocation section 12 so as to carry out default resource allocation and scheduling. Therefore, immediately after the object is updated, the resource allocation section 12 carries out default resource allocation and scheduling.

The transmission channel as the transmission schedule for multiple-address transmission of the event is predetermined. In a system in which the broadcasting channel of the event changes, the receiving terminal 5 must wait for an event to be transmitted at an unknown time on an unknown channel and the processing load is increased. Also, it is anticipated that failure to receive the event (reception error) will increase. Thus, the transmission channel is predetermined to prevent such reception errors. That is, if the event is transmitted on a fixed channel (constantly on the same channel), the receiving terminal 5 can receive the event by receiving the incoming data on that channel. Therefore, the processing load for receiving the event is minimized and the failure to receive the event is reduced.

Hereinafter, the resource allocation and scheduling for transmitting the event, carried out by the resource allocation section 12, are collectively referred to as resource allocation, similarly to the case of the subject.

On completion of the resource allocation processing for the event at step S21, the processing goes to step S22, where the event constitution section 19 constitutes an event for obtaining a subject with respect to the update target object. Specifically, the event constitution section 19 constitutes an event having the same identifier as the identifier added to the subject constituted by the subject constitution section 16, added to the update target object, as shown in FIGS. 11A, 11B and 11C. The event is constituted by arranging a discrimination flag in the same identifier as the identifier added to the subject, and also by arranging broadcasting schedule information or server access information, as shown in FIGS. 11A, 11B and 11C.

The broadcasting schedule information is information necessary for receiving the subject (description of the subject obtaining method) in the case where the subject is to be broadcast through the broadcasting network 4. The broadcasting schedule information includes the broadcasting channel, broadcasting time, data rate, the number of times of transmission and the like of the subject as the result of resource allocation supplied from the resource allocation section 12. Therefore, the broadcasting channel and the broadcasting time of the subject for updating the object of the identifier constituting the event can be recognized by referring to the broadcasting schedule information constituting the event. Thus, it is possible to receive the subject.

The broadcasting schedule information constituting the event can include the providing status of the subject obtained on the basis of the event, that is, the time required for multiple-address transmission of the subject (on the side of the receiving terminal 5, the time required for receiving the subject, which need not be the time itself but can be recognized from the data rate and the data quantity of the subject) and the like.

The broadcasting schedule information can also include the type of update of the object carried out by using the subject thus obtained, that is, information concerning which of new registration, change, and deletion of the object is to be carried out.

The server access information is information necessary for requesting the subject through the communication network 6 (description of the subject obtaining method) in the case where the subject is to be transmitted from the server 2, the mirror server 7 or another subject providing server through the communication network 6 (that is, in the case where the subject is transmitted by individual transmission). The server access information includes information concerning the location in the network topology such as the IP address of the server 2, the mirror server 7 or another server on the communication network 6. The IP address of the server 2 is supplied from the resource allocation section 12 to the event constitution section 19 in the case where the subject is stored in the storage 23. The resource allocation section 12 also supplies the IP address of the subject providing server to the event constitution section 19 with reference to the duplicate management section 14.

By referring to the server access information constituting the event, the server which manages the subject for updating the object of the identifier constituting the event can be recognized. Thus, it is possible to request individual transmission of the subject to the server.

The server 2 and the mirror server 7 manage the subject by associating the URL constituted by adding the identifier to the IP address, with the subject constituted by the update object information and the identifier added thereto. In this case, the receiving terminal 5, having received the event, can recognize the URL of the subject having the same identifier as the identifier of the event, from the server access information and identifier constituting the event.

The server access information constituting the event can include the providing status of the subject obtained on the basis of the event, that is, the degree of congestion of the circuit for individual transmission of the subject, the substantial transfer rate (the type and speed of the circuit connected to the server for transmitting the subject by individual transmission) and the like.

The server access information can also include the type of update of the object carried out by using the subject thus obtained (that is, which of new registration, change, and deletion of the object), similarly to the broadcasting schedule information.

In a certain case, the subject is provided only through the broadcasting network 4. In such a case, only an event in which the broadcasting schedule information is arranged is constituted as the event with respect to the subject, as shown in FIG. 11A. On the contrary, in another case, the subject is provided only through the communication network 6. In such a case, only an event in which the access server information is arranged is constituted as the event with respect to the subject, as shown in FIG. 11B.

In the case where the subject is to be transmitted through the broadcasting network 4 on a plurality of channels and at a plurality of times, an event in which broadcasting schedule information corresponding to the plurality of channels and the plurality of times is arranged is produced as the event with respect to the subject. Similarly, in the case where the subject can be provided through the communication network 6 from a plurality of servers, an event in which server access information corresponding to the plurality of servers is arranged is produced as the event with respect to the subject. In this case, the receiving terminal 5 can select the server to access from the plurality of servers.

In the case where a plurality of subject obtaining methods exist, the event constitution section 19 prepares both broadcasting schedule information and server access information, or prepares a plurality of pieces of broadcasting schedule information or server access information. In this case, one event in which all the information is arranged may be constituted instead of constituting events in which respective pieces of information are arranged. FIG. 11C shows an event in which both broadcasting schedule information and server access information are arranged.

Also, in the case where a plurality of subject obtaining methods exist, it is sometimes desired to preferentially obtained the subject at the receiving terminal 5 particularly by a predetermined obtaining method from among the plural obtaining methods. For example, in the case where the subject is provided from the server 2 both by multiple-address transmission and by individual transmission, when there are a number of receiving terminals demanding the subject, providing by multiple-address transmission is more efficient than providing by individual transmission. Thus, in such a case, it is possible to cause the resource allocation section 12 to preferentially allocate the resource by using the obtaining method by multiple-address transmission, that is, to the event in which the broadcasting schedule information is arranged, than by using the obtaining method by individual transmission, that is, to the event in which the server access information is arranged. Specifically, it is possible to allocate a higher data rate or to advance the broadcasting time with respect to the event in which the broadcasting schedule information is arranged than the event in which the server access information is arranged.

Referring again to FIG. 10, as the event constitution section 19 prepares the event for obtaining the update target object at step S22, the event is supplied and stored in the event storage section 20. Then, the processing goes to step S23, where the transmission control section 21 waits until the broadcasting time determined by the scheduling with respect to the event stored in the event storage section 20 and then controls the transmission section 18. Thus, the event is transmitted by multiple-address transmission and the event transmission processing ends.

Thus, the event is transmitted through the broadcasting network 4 on the basis of the resources (transmission band, number of times of transmission, broadcasting channel, broadcasting time and the like) determined by the resource allocation section 12.

Basically, the multiple-address transmission of the event or subject is carried out repeatedly for the following reason. That is, since transmission of data through the broadcasting network 4 is carries out only unidirectionally from the server 2 to the receiving terminal 5, it is possible to confirm whether data transmission/reception has been accurately carried out or not between the server 2 and the receiving terminal 5. Thus, the server 2 is adapted to repeat data transmission only for the number of times of transmission (or during the transmission time) as the result of resource allocation by the resource allocation section 12, thereby improving the probability of accurate data reception at the receiving terminal 5.

The resource allocation section 12 carries out scheduling so that, basically, multiple-address transmission of the subject with respect to the update target object is carried out after multiple-address transmission of the event for obtaining the subject. This is because the event for receiving the subject cannot be referred to at the receiving terminal 5 is the multiple-address transmission of the subject is carried out before the multiple-address transmission of the event.

As is understood from the structure of the subject and event shown in FIGS. 9 and 11, in general, the event has a small data quantity and the subject has a large data quantity. Therefore, the resource allocation section 12 carries out resource allocation so that the number of times of transmission is basically large for the event and small for the subject. Thus, the probability that the receiving terminal 5 fails to receive the event transmitted through the broadcasting network 4 is reduced. Moreover, if the event can be correctly received, the channel and time at which the subject is transmitted through the broadcasting network 4 can be recognized by referring to the broadcasting schedule information included in the event. Consequently, the probability of failure to receive the subject transmitted for a small number of times can also be reduced. Even in the case where reception of the subject with the recognized broadcasting channel or broadcasting time based on the event ends up in failure, or even in the case where the subject is required before the broadcasting time, the subject can be obtained early and securely by accessing the server 2 or the mirror server 7 through the communication network 6 on the basis of the server access information if the server access information is included in the event.

From the above description, it is necessary or important that the receiving terminal 5 first receives the event. Therefore, it is desired to allocate the broadcasting time of the event or a broad transmission band to a time zone predicted to secure the state where the receiving terminal 5 can receive the data transmitted by multiple-address transmission.

The request data receiving processing carried out by the server 2 will now be described with reference to the flowchart of FIG. 12.

The receiving terminal 5 transmits request data through the communication network 6. At step S31, it is discriminated whether or not the request data is received at the communication control section 11.

Specifically, the receiving terminal 5 receives an event transmitted by multiple-address transmission as described above. If a subject corresponding the event (subject obtained on the basis of the event) is immediately needed, or if the subject is not immediately needed but is needed earlier than the broadcasting time described in the broadcasting schedule information of the event, the receiving terminal 5 transmits the request data for requesting the subject, for example, to the server 2 through the communication network 6. At step S31, it is discriminated whether or not the request data thus transmitted is received at the communication control section 11.

If it is discriminated at step S31 that the request data is not received, the processing returns to step S31. If it is discriminated at step S31 that the request data is received, the request data is supplied to the demand processing section 13. The processing then goes to step S32, where the demand processing section 13 discriminates whether the request data requests multiple-address transmission or individual transmission of the subject.

Figure 13:
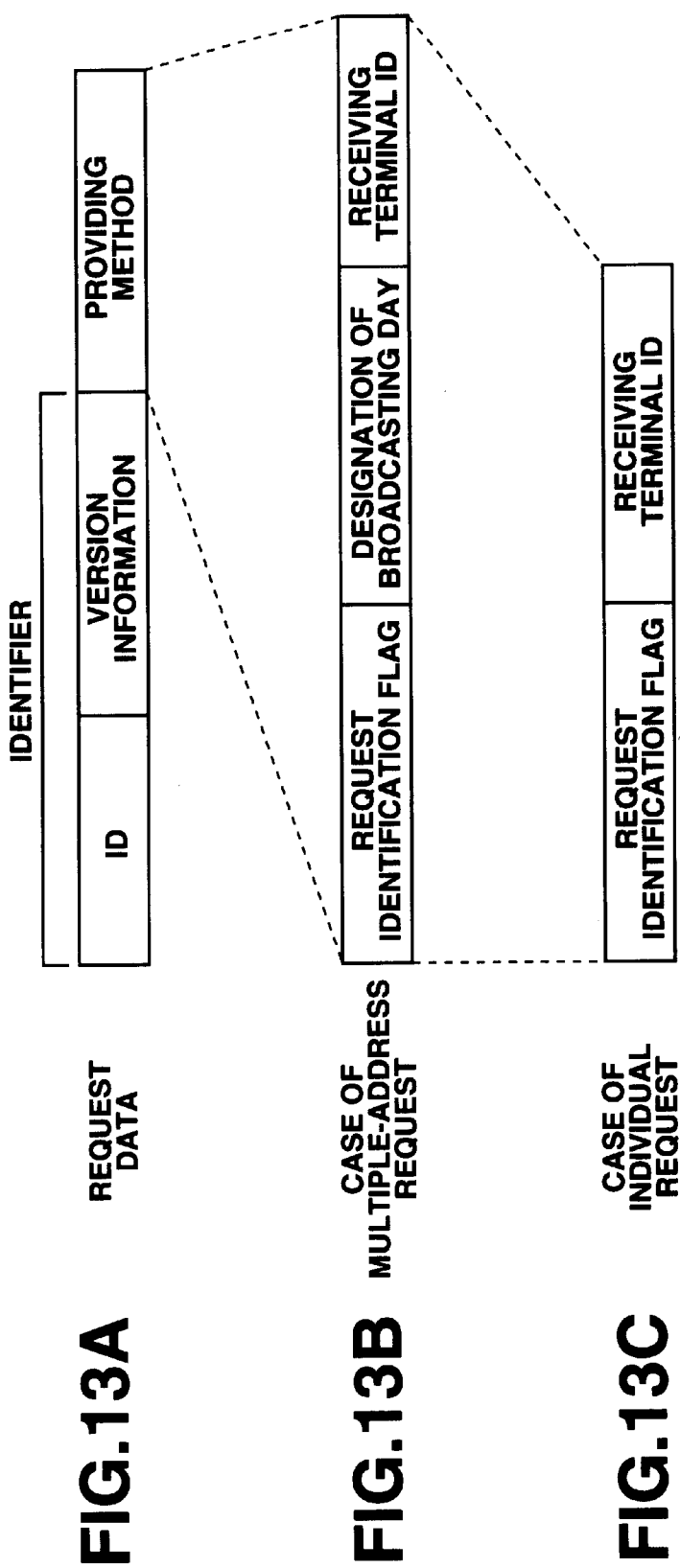
FIGS. 13A, 13B and 13C show the format of request data in the data distribution system.

FIG. 13 shows the format of the request data transmitted from the receiving terminal 5.

The request data includes the identifier (ID and version information) of the subject requested thereby, and description of the way to receive the provision of the subject (the providing method for receiving the provision of the subject), as shown in (A) of FIG. 13. The way to receive the provision of the subject (hereinafter suitably referred to as the providing method) includes different information in accordance with the case of multiple-address transmission or the case of individual transmission.

Specifically, as the providing method for the request data requesting the provision of the subject by multiple-address transmission, a request identification flag, designation of broadcasting date, receiving terminal ID and the like are arranged, as shown in (B) of FIG. 13.

The request identification flag is adapted for identifying whether the request data requests the provision of the subject by multiple-address transmission or by individual transmission. As the request identification flag of the request data requesting the provision of the subject by multiple-address transmission, information indicating that the request data requests the provision of the subject by multiple-address transmission is arranged.

As the designation of broadcasting date, the extent of request (hereinafter suitably referred to as the degree of request) of the subject requested by the request data (hereinafter suitably referred to as the requested subject) is arranged. That is, as the designation of broadcasting date, information indicating that the subject is immediately needed, information indicating by when or within how many hours the subject will be needed, or the broadcasting date (including the time, if necessary) desired for broadcasting the subject by multiple-address transmission is arranged.

As the receiving terminal ID, information for specifying the receiving terminal which transmitted the request data is arranged. Specifically, each receiving terminal has unique ID allocated thereto, and the ID is arranged as the receiving terminal ID. As the receiving terminal ID, for example, the IP address, the Ethernet address (MAC (media access control) address) or the like can be used. With respect to the request data requesting the provision of the subject by multiple-address transmission, it is possible to avoid arrangement of the receiving terminal ID.

On the other hand, as the providing method for the request data requesting the provision of the subject by individual transmission, a request identification flag, receiving terminal ID and the like are arranged, as shown in (C) of FIG. 13. In this case, information indicating that the request data requests the provision of the subject by individual transmission is arranged as the request identification flag, and unique ID appended to the receiving terminal which is the transmission source of the request data is arranged as the receiving terminal ID, similarly to the case shown in (B) of FIG. 13.

Referring again to FIG. 12, if it is discriminated at step S32 that the request data request multiple-address transmission of the subject, the processing goes to step S33, where the demand processing section 13 totals the demand for multiple-address transmission of the subject requested by the request data. Specifically, the demand processing section 13 detects the request data for requesting multiple-address transmission of the subject, transmitted during a predetermined past period retrospectively from the present time. Then, the demand processing section 13 calculates the general degree of request as described above on the basis of the detected request data, as the result of totaling of the demand for multiple-address transmission of the subject. The result of totaling of the demand for multiple-address transmission of the subject is supplied from the demand processing section 13 to the resource allocation section 12.

On receiving the result of totaling of the demand for multiple-address transmission of the requested subject, the resource allocation section 12 goes to step S34 and discriminates whether the resource allocation of the requested subject should be changed or not, on the basis of the result of totaling. If it is discriminated at step S34 that the resource allocation of the requested subject should not be changed, that is, if the demand for multiple-address transmission of the requested subject is balanced with the present resource allocation with respect to the requested subject, the request data receiving processing ends. Therefore, in this case, the requested subject is to be later transmitted by multiple-address transmission of the basis of the present resource allocation.

If it is discriminated at step S34 that the resource allocation of the requested subject should be changed, that is, if the demand for multiple-address transmission of the requested subject is higher or lower and therefore is not balanced with the present resource allocation with respect to the requested subject, the processing goes to step S35, where the resource allocation section 12 changes the resource allocation with respect to the requested subject, as described with reference to FIGS. 3A, 3B and 4.

Specifically, if the demand for multiple-address transmission of the requested subject is higher, for example, the transmission band allocated to the requested subject is changed to be broader, or the broadcasting time for multiple-address transmission of the requested subject is changed to be earlier. On the contrary, if the demand for multiple-address transmission of the requested subject is lower, for example, the transmission band allocated to the requested subject is changed to be narrower, or the broadcasting time for multiple-address transmission of the requested subject is changed to be later. Then, the resource allocation section 12 transmits information about the changed resource allocation to the transmission control section 21.

After the change of the resource allocation, the processing goes to step S36, where multiple-address transmission is carried out in accordance with the changed resource allocation under the control of the transmission control section 21. Specifically, if the requested subject obtaining method (for example, broadcasting time or the like) is changed in accordance with the change of the resource allocation with respect to the requested subject, an event including description of the changed obtaining method is constituted and transmitted by multiple-address transmission as described above. The receiving terminal 5 receives the event, thereby recognizing that the broadcasting time or the like of the requested subject is changed.

After the transmission of the event, the requested subject is transmitted by multiple-address transmission in accordance with the changed resource allocation, and the request data receiving processing ends.

Thus, more resources are allocated to the subject of large demand and less resources are allocated to the subject of small demand, thereby enabling efficient multiple-address transmission of the subject.

Meanwhile, if it is discriminated at step S32 that the request data requests individual transmission of the subject, the processing goes to step S37, where the demand processing section 13 totals the demand for individual transmission of the subject requested by the request data. Specifically, the total number of request data that have not been dealt with, of the request data transmitted in the past for requesting individual transmission of the requested subject, is calculated. (That is, request data for which neither individual transmission nor load-distributed processing as will be later described has been carried out, of the request data requesting individual transmission, is calculated.) The result of totaling of the demand for individual transmission of the subject is supplied from the demand processing section 13 to the resource allocation section 12. The totaling of the demand for individual transmission can also be carried out, for example, by counting the number of receiving terminals which transmitted the request data requesting individual transmission within a predetermined unit time period.

On receiving the result of totaling of the demand for individual transmission of the requested subject, the resource allocation section 12 goes to step S38 and discriminates whether or not the server 2 has sufficient processing capability with respect to the demand for individual transmission of the requested subject. If it is discriminated at step S38 that the server 2 has sufficient processing capability with respect to the demand for individual transmission of the requested subject, the processing goes to step S39, where the resource allocation section 12 allocates a resource necessary for individual transmission of the requested subject (for example, particularly the processing time for carrying out processing for individual transmission of the requested subject) to the communication control section 11 and the storage management section 22, which are blocks concerning individual transmission.

The processing goes to step S40, where the requested subject is transmitted by individual transmission through the communication network 6 on the basis of the resource allocation of step S39. Then, the request data receiving processing ends. Specifically, the storage management section 22 reads out the requested subject from the storage 23 under the control of the resource allocation section 12. The requested subject is recognized by referring to the identifier included in the request data. (The identifier, which is adapted for identifying the object, is also adapted for identifying the event and subject.)

The storage management section 22 supplies the requested subject read out from the storage 23 to the communication control section 11, and causes the communication control section 11 to transmit the requested object through the communication network 6 to the receiving terminal which transmitted the request data. The receiving terminal which transmitted the request data is recognized by referring to the receiving terminal ID included in the request data.

On the other hand, if the resource allocation section 12 discriminates at step S38 that the server 2 does not have sufficient processing capability with respect to the demand for individual transmission of the requested subject, the processing goes to step S41, where load-distributed processing is carried out. Then, the request data receiving processing ends.

Specifically, in the load-distributed processing, first, the resource allocation section 12 controls the event constitution section 19 so that the IP addresses of subject providing servers except for the server 2 managing the requested subject constitute an event arranged as server access information. Moreover, the resource allocation 12 controls the transmission control section 21 to preferentially transmitting by multiple-address transmission the event constituted by the event constitution section 19. Thus, in the load-distributed processing, the event in which the IP addresses of the subject providing servers except for the server 2 are arranged as server access information is transmitted by multiple-address transmission preferentially over other events.

In the case where the load-distributed processing is carried out at the server 2, individual transmission of the requested subject to the receiving terminal which requested individual transmission is not carried out. However, the receiving terminal can recognize the subject providing server managing the requested subject, by receiving the event transmitted by multiple-address transmission in accordance with the load-distributed processing. By newly requesting individual transmission of the requested subject to the subject providing server, the receiving terminal can receive the provision of the requested subject.

Figure 12:
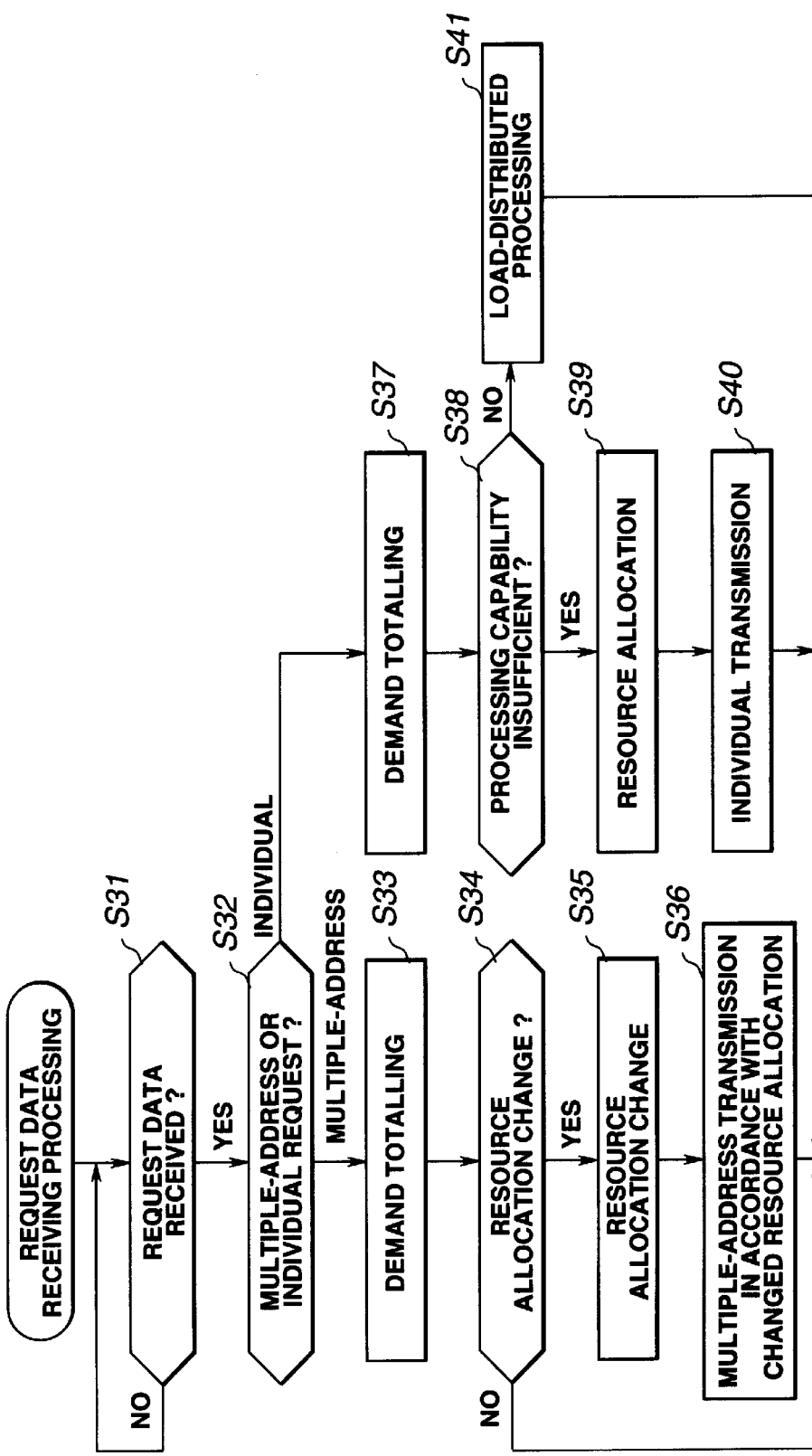
FIG. 12 is a flowchart for explaining request data receiving processing carried out by the server.

In this case, since an access (request for individual transmission) to the server 2 can be consequently distributed to another server (subject providing server), the processing at step S41 of FIG. 12 is called load-distributed processing.

Figure 14:
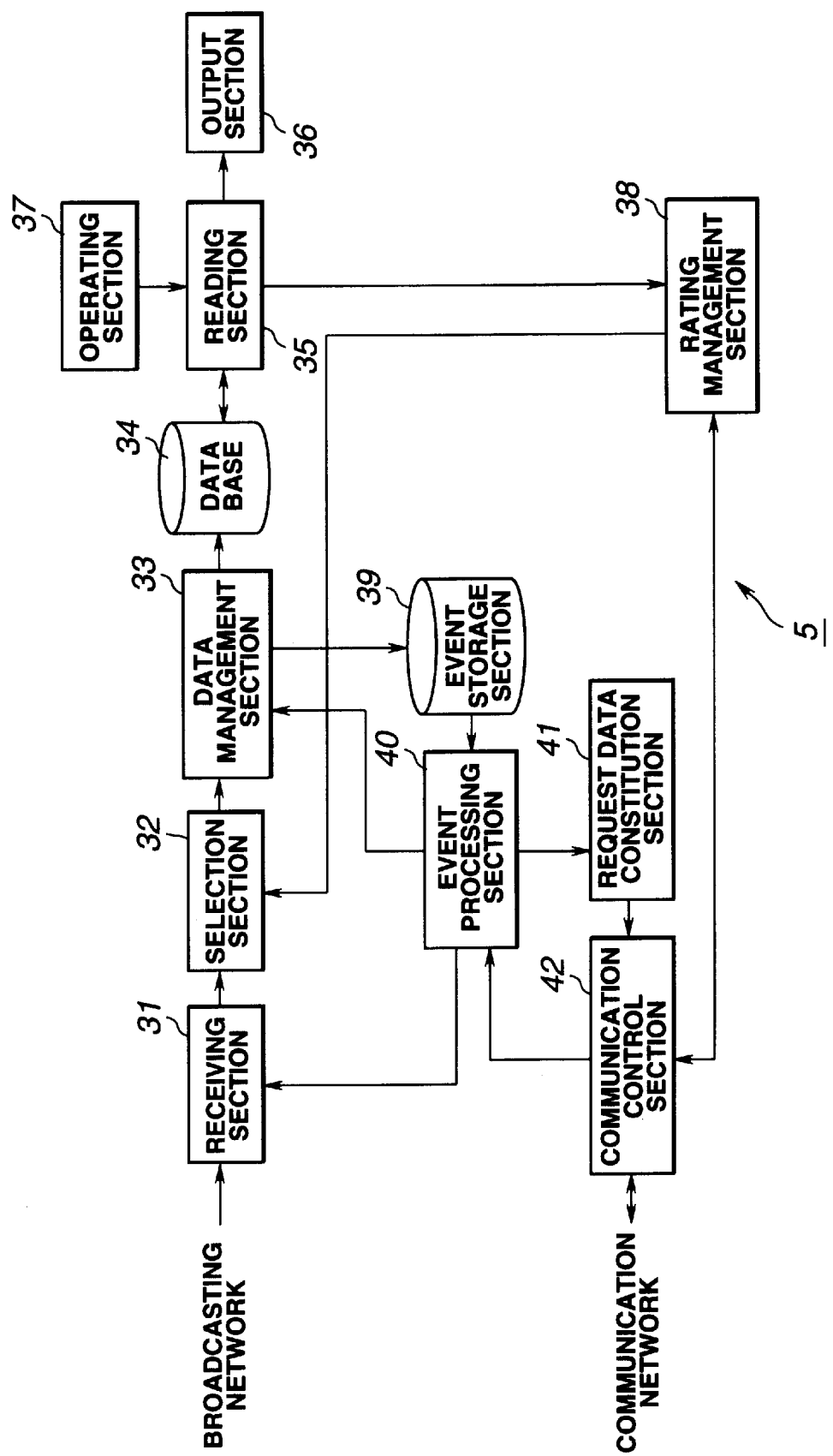
FIG. 14 is a block diagram showing an exemplary structure of a receiving terminal in the data distribution system.

FIG. 14 shows an exemplary structure of the receiving terminal 5 of FIG. 1.

A receiving section 31 receives the data transmitted from the server 2 through the broadcasting network 4, that is, events and subjects, and outputs the data to a selection section 32. The selection section 32 selects an event or subject from the receiving section 31 and supplies the selected event and subject to a data management section 33. The data management section 33 updates an object registered in a database 34 on the basis of the subject supplied from the selection section 32 or an event processing section 40. Moreover, the data management section 33 outputs the event supplied from the selection section 32 to an event storage section 39.

The database 34 is constituted by, for example, a hard disk, a magneto-optical disc, or another recording medium of a large capacity, and is adapted for storing the object. A reading section 35 reads out the object stored in the database 34 in response to the operation of an operating section 37 and supplies the object to an output section 36. The output section 36 is constituted by, for example, a display or a speaker, and is adapted for displaying an image corresponding to the object from the reading section 35 or form outputting a sound corresponding thereto. The operating section 37 is operated by the user in the case where the reading section 35 is caused to read out the object from the database 34.

A rating management section 38 monitors the object read out from the database 34 by the reading section 35 and calculates the audience rating of each object. The audience rating is read out from a communication control section 42 and transmitted to the server 2 through the communication network 6, for example, periodically or in response to the request from the server 2. In the server 2, the audience rating thus transmitted is received by the communication control section 11 and is supplied to the demand processing section 13. The demand processing section 13 sets an initial value of the demand for the update target object as described above, on the basis of the audience rating thus obtained.

The event storage section 39 stores the event outputted from the data management section 33. The event processing section 40 reads out the event stored in the event storage section 39 and controls the receiving section 31 and a request data constitution section 41 on the basis of the event, thereby carrying out processing for obtaining the necessary subject. The request data constitution section 41 constitutes the request data as described with reference to FIG. 13 under the control of the event processing section 40.

The communication control section 42 is adapted for carrying out communication control through the communication network 6, thereby transmitting the request data outputted from the request data constitution section 41 and the audience rating outputted from the rating management section 38 through the communication network 6, or receiving the subject transmitted through the communication network 6. The subject received by the communication control section 42 is supplied to the data management section 33 through the event processing section 40.

At the receiving terminal 5 constituted as described above, receiving processing for receiving the event and subject transmitted from the server 2 through the broadcasting network 4 and event processing for processing the event received by the receiving processing are carried out.

Figure 15:
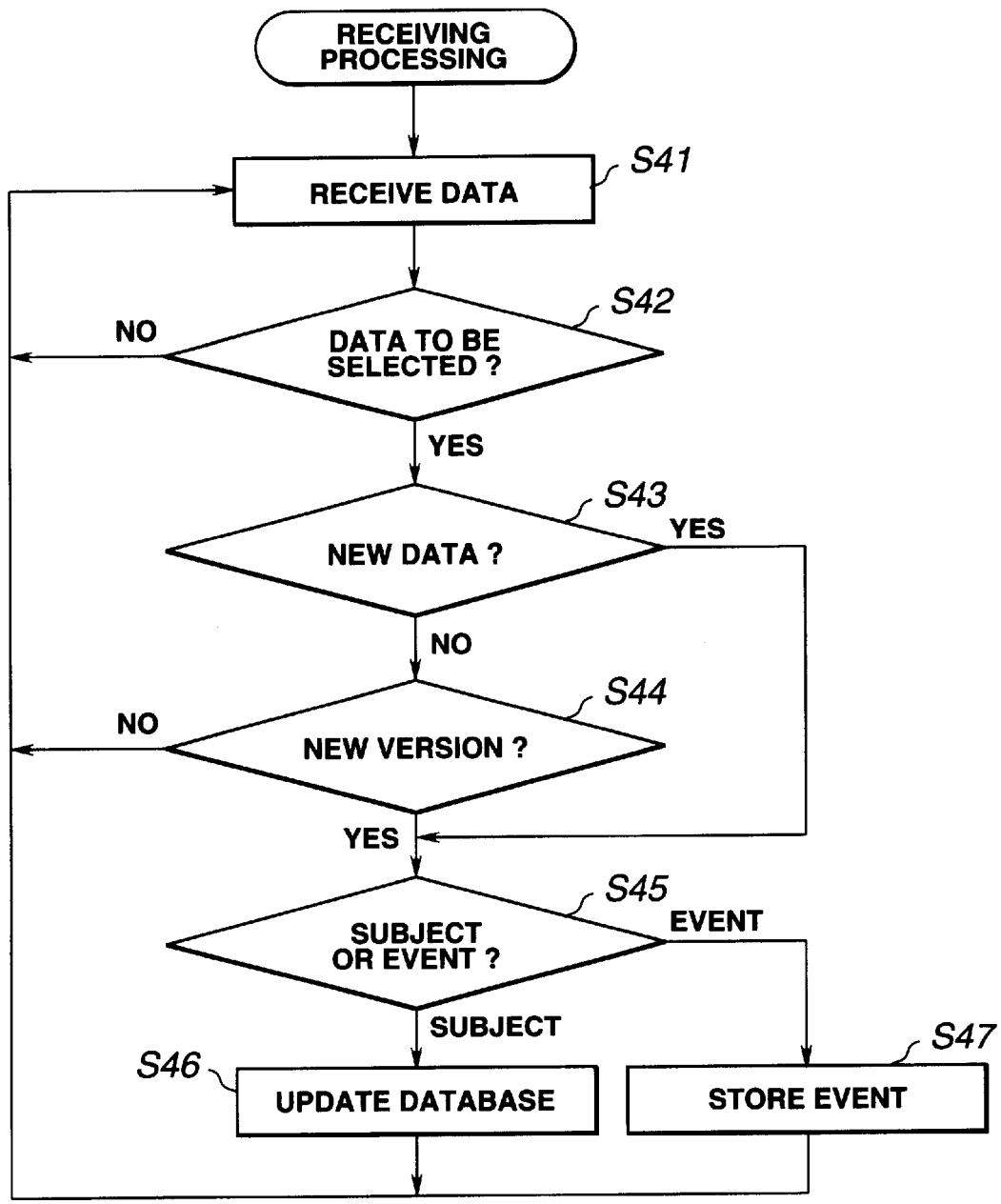
FIG. 15 is a flowchart for explaining receiving processing carried out by the receiving terminal.

The receiving processing will now be described with reference to the flowchart of FIG. 15.

When data is transmitted from the server 2 through the broadcasting network 4, the receiving section 31 at step S41 receives the data, that is, the event or subject, and supplies the data to the selection section 32. At step S42, the selection section 32 evaluates the necessity of the event or subject from the receiving section 31 and discriminates whether the event or subject should be selected or not, on the basis of the result of evaluation.

Specifically, in the case where all the events and subjects transmitted from the server 2 through the broadcasting network 4 are to be received, the database 34 and the event storage section 39 must have an extremely large storage capacity. The user has his/her preference and each user rarely needs all the objects stored in the database of the server 2. It is not preferred that all the registered contents of the database 3 of the server 2 are reflected on the database 34 despite the need for a large storage capacity and the user's preference as described above.

Thus, if ID (ID constituting the above-described identifier) for an object desired by the user is registered to the selection section 32, the selection section 32 selects only the event or object having the same ID as that ID. In this case, the evaluation of the necessity of the event or subject at step S42 is carried out by comparing the ID registered by the user and the ID constituting the identifier of the event or subject supplied from the receiving section 31.

Also, the evaluation of the necessity of the event or subject at step S42 can be carried out, for example, on the basis of the audience rating managed by the rating management section 38. In this case, when the rating of the subject corresponding to the event or subject from the receiving station 31 (the object to which the same ID as that of the event or subject from the receiving section 31 is appended) is 0%, the event or subject is eliminated by the selection section 32. However, for example, immediately after the purchase of the receiving terminal 5, since no audience rating is stored in the rating management section 38, all the event and subjects are eliminated by the selection section 32. Thus, at the receiving terminal 5, whether selection of events and subjects based on the audience rating is to be carried out by the selection section 32 as described above can be set by operating the operating section 37. Specifically, if the operating section 37 is set not to carry out the processing of step S43 after the processing of step S41 without carrying out the processing of step S42. If no audience rating is stored in the rating management section 38 even when such setting is not carried out, it is possible to automatically skip the processing of step S42 so as to proceed to step S43.

If it is discriminated at step S42 that the event or subject from the receiving section 31 should not be selected, the processing returns to step S41 when the next event or subject is transmitted through the broadcasting network 4. Therefore, in this case, the event is not stored in the event storage section 39 and updating of the database 34 based on the subject is not carried out, either.

On the other hand, if it is discriminated at step s42 that the event or subject from the receiving section 31 should be selected, the selection section 32 outputs the event or subject from the receiving section 31 to the data management section 33, and the processing goes to step S43. At step S43, the data management section 34 discriminates whether the event or subject from the selection section 32 concerns a new object or not.

If it is discriminated at step S43 that the event or subject from the selection section 32 concerns a new object, that is, if an object having the same ID as the ID included in the event or subject is not registered to the database 34, the processing goes to step S45, skipping step S44.

If it is discriminated at step S43 that the event or subject from the selection section 32 does not concern a new object, that is, if an object having the same ID as the ID included in the event or subject is registered to the database 34, the processing goes to step S44. Then, the data management section 33 discriminates whether or not the version information described in the identifier of the object already registered to the database 34 (hereinafter suitably referred to as a registered object) is equal to the version information described in the identifier of the event or subject from the selection section 32.

If the version information described in the registered object is equal to the version information described in the event or subject from the selection section 32 at step S44, that is, if the registered object is already updated by the subject of the past transmission of repeated transmission of the same subject through the broadcasting network 4 from the server 2 to improve the reliability as described above, steps S45 to S47 are skipped, and the processing returns to step S41 when the event or subject is transmitted next. Therefore, in this case, the event is not stored in the event storage section 39 and updating of the database 34 based on the subject is not carried out, either.

On the other hand, if the version information described in the registered object is not equal to the version information described in the event or subject from the selection section 32 at step S44, that is, if the version of the event or subject from the selection section 32 is newer than the version of the registered object, the processing goes to step S45, where the data management section 33 discriminates whether the output of the selection section 32 is an event or a subject by referring to the discrimination flag.

If it is discriminated at step S45 that the output of the selection section 32 is a subject, the processing goes to step S46, where the data management section 33 updates the database 34 on the basis of the subject.

Specifically, if a new object is arranged as update object information in the subject, the new object is associated with the identifier included in the subject and is newly registered to the database 34.

If the updated object is arranged as update object information in the subject, an object having the identifier having the same ID as the ID included in the subject is retrieved from the database 34, and the retrieved object is changed to the updated object. Moreover, an increment of 1 is made on the version information associated with the object.

If an object deletion command is arranged as update object information in the subject, an object associated with the identifier having the same ID as the ID included in the subject is retrieved from the database 34 and is deleted together with the identifier associated with the object.

The update of the object based on the update object information at step S2 of the registration processing described in FIG. 6 is carried out similarly.

After the database 34 is updated in the above-described manner at step S46, the processing returns to step S41 when the event or subject is transmitted next.

Meanwhile, if it is discriminated at step S45 that the output of the selection section 32 is an event, the processing goes to step S47, where the data management section 33 supplies the event to the event storage section 39 so as to temporarily store the event therein. Then, the processing returns to step S41 when the event or subject is transmitted next.

The event stored in the event storage section 39 at step S47 is erased after it is read out from the event storage section 39 by the event processing section 40 in the event processing, which will be described hereinafter.

Figure 16:
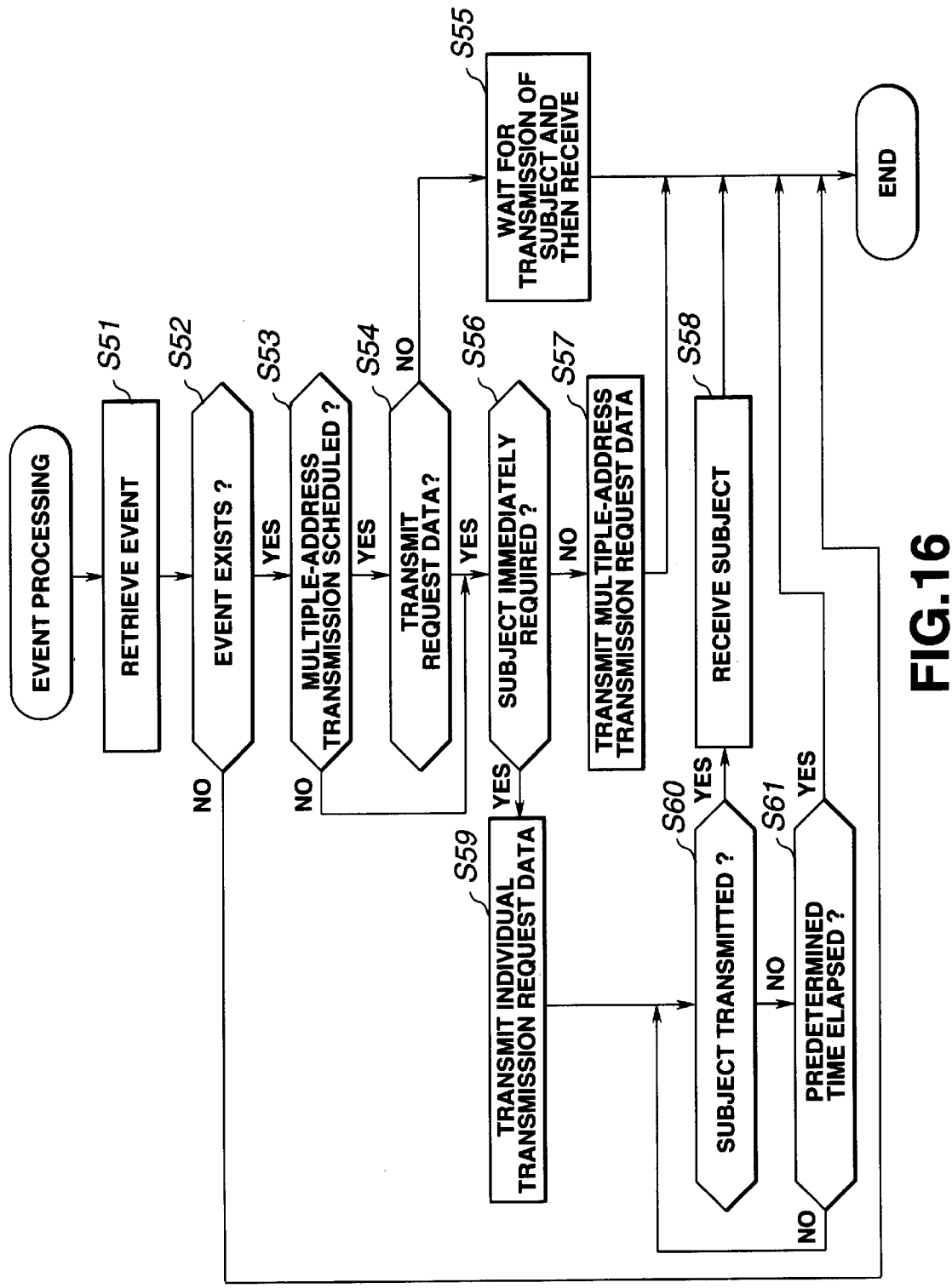
FIG. 16 is a flowchart for explaining event processing carried out by the receiving terminal.

The event processing carried out by the receiving terminal 5 will now be described with reference to the flowchart of FIG. 16. This event processing is periodically carried out at the receiving terminal 5. However, it is possible to carry out the event processing irregularly.

In the event processing, first, at step S51, the storage contents of the event storage section 39 are retrieved by the event processing section 41. The processing then goes to step S52, where it is discriminated whether or not events are stored in the event storage section 39. If it is discriminated at step S52 that events are not stored, the event processing ends.

If it is discriminated at step S52 that events are stored in the event storage section 39, the event processing section 40 reads out events having the same identifier appended thereto from the events stored in the event storage section 39. With respect to the read-out events (hereinafter suitably referred to as processing target events), processing of step S53 and the subsequent steps is carried out.

Specifically, at step S53, the event processing section 40 discriminates whether multiple-address transmission of a subject corresponding to the processing target event (a subject to which the same identifier as that of the processing target event is appended) is scheduled or not. If it is discriminated at step S53 that multiple-address transmission of the subject corresponding to the processing target event (hereinafter suitably referred to as a noted subject) is scheduled, that is, if broadcasting schedule information is arranged in the processing target event, the processing goes to step S54. The event processing section 40 evaluates the necessity of the noted subject and discriminates whether request data for requesting the noted subject should be transmitted or not on the basis of the result of evaluation.

Even in the case where multiple-address transmission of the noted subject is scheduled, if the noted subject is needed before the broadcasting time at which the multiple-address transmission is to be carried out (for example, if the application requires the object to be updated by the noted subject), it is evaluated that the noted subject is needed early. On the basis of this result of evaluation, it is discriminated at step S54 that the request the noted subject should be transmitted. On the other hand, if the noted subject is needed after the broadcasting time at which the multiple-address transmission is to be carried out (for example, if the application requiring the object to be updated by the noted subject has not started), it is evaluated that the noted subject is not needed early. On the basis of this result of evaluation, it is discriminated at step S54 that the request data requesting the noted subject should not be transmitted.

If it is discriminated at step S54 that the request data requesting the noted subject should not be transmitted, the processing goes to step S55, where the event processing section 40 controls the receiving section 31 to receive the noted subject transmitted in accordance with the broadcasting schedule information of the processing target event. Then, the event processing ends. In this case, when the broadcasting time of the noted subject is reached, the receiving section 31 turns the power of the receiving terminal 5 on, if the power is off. Then, the receiving terminal 5 carries out the receiving processing described in FIG. 15. Thus, the noted subject is received (obtained) in delayed synchronization, for example, in conformity to the protocol based on the UDP, and the object stored in the database 34 is updated on the basis of the noted subject.

If there are a plurality of processing target events and the broadcasting schedule information is arranged in two or more the plurality of events, the broadcasting schedule information of the earliest broadcasting time is selected and the receiving section 31 is controlled to receive the noted subject in accordance with the selected broadcasting schedule information at step S55. Alternatively, the broadcasting schedule information having the shortest time period required for receiving the noted subject (time required for multiple-address transmission from the server 2) is selected from the plurality of pieces of broadcasting schedule information by referring to the providing status of the noted subject arranged therein, and the noted subject is received in accordance with the selected broadcasting schedule information.

Meanwhile, if the event processing section 40 discriminates at step S53 that multiple-address transmission of the noted subject is not scheduled (if there is no processing target event having the broadcasting schedule information arranged therein and there is only processing target events having the server access information arranged therein), or if it is discriminated at step S54 that the request data requesting the noted subject should be transmitted, the processing goes to step S56. The event processing section 40 evaluates the necessity of the noted subject, and discriminates whether the noted subject is immediately needed or not on the basis of the result of evaluation.

For example, if the application immediately requires the object to be updated by the noted subject, the necessity of the noted subject is evaluated as being high. On the basis of this result of evaluation, it is discriminated at step S56 that the noted subject is immediately needed. On the other hand, for example, if the application requiring the object to be updated by the noted subject has not started, the necessity of the noted subject is evaluated as being low. On the basis of this result of evaluation, it is discriminated at step S56 that the noted subject is not immediately needed.

If the event processing section 40 discriminates at step S56 that the noted subject is immediately needed, the processing goes to step S59 and the request data constitution section 41 is controlled to constitute request data requesting individual transmission of the noted subject. On constituting the request data requesting individual transmission of the noted subject, the request data constitution section 41 controls the communication control section 42 to transmit the request data to the server 2 through the communication network 6. Then, the processing goes to step S60.

Having received the request data requesting individual transmission of the noted subject, thus transmitted, the server 2 carries out individual transmission at step S40 in the request data receiving processing described in FIG. 12. Thus, the noted subject may be synchronously transmitted to the receiving terminal 5 through the communication network 6, for example, in conformity to the protocol based on the TCP/IP. At step S60, the communication control section 42 discriminates whether or not the noted subject is transmitted in such a manner.

If the communication control section 42 discriminates at step S60 that the noted subject is transmitted by individual transmission, the processing goes to step S58, where the noted subject is received. The noted subject received by the communication control section 42 is supplied to the data management section 33 through the event processing section 41. The data management section 33 updates the object stored in the database 34 on the basis of the noted subject. Thus, the event processing ends.

On the other hand, if the communication control section 42 discriminates at step S60 that the noted subject is not transmitted by individual transmission, the processing goes to step S61, where it is discriminated whether or not a predetermined time has elapsed from the transmission of the request data requesting individual transmission at step S59. If the communication control section 42 discriminates at step S61 that a predetermined time has not elapsed from the transmission of the request data requesting individual transmission, the processing returns to step S60.

If the communication control section 42 discriminates at step S61 that a predetermined time has elapsed from the transmission of the request data requesting individual transmission, the event processing ends. Specifically, at the server 2 having received the request data requesting individual transmission, the load-distributed processing may be carried out at step S41 in the request data receiving processing described in FIG. 12. In such a case, the noted subject is not transmitted by individual transmission. Therefore, if the noted subject is not transmitted by individual transmission even after a predetermined time elapsed from the transmission of the request data requesting individual transmission, the event processing ends.

In this case, an event in which the IP address of the subject providing server except for the server 2 is arranged as server access information is transmitted by multiple-address transmission by the load-distributed processing carried out at step S41 in the request data receiving processing described in FIG. 12. Therefore, at the receiving terminal 5, the event processing (FIG. 16) is carried out after receiving the event. Thus, the request data is transmitted to the server corresponding to the server access information arranged in the received event at step S59 so as to request individual transmission of the noted subject.

If a plurality of events having server access information arranged therein exist among the processing target events, it is possible at step S59 to select the server access information having the minimum congestion of the circuit for carrying out individual transmission of the noted subject or the server access information substantially having the highest transfer rate from among the plural pieces of server access information by referring to the providing status of the noted subject arranged therein and to request the noted subject in accordance with the selected server access information. (In this case, the request data requesting individual transmission is not necessarily transmitted to the server 2.)

Meanwhile, if the event processing section 40 discriminates at step S56 that the noted subject is not immediately needed, the processing goes to step S57 and the event processing section 40 controls the request data constitution section 41 to constitute request data requesting multiple-address transmission of the noted subject. On constituting the request data requesting multiple-address transmission of the noted subject, the request data constitution section 41 controls the communication control section 42 to transmit the request data to the server 2 through the communication network 6. Then, the event processing ends. The request data requesting multiple-address transmission of the noted subject can include the broadcasting time (broadcasting date) at which multiple-address transmission of the noted subject is to be carried out.

As described above, at the server 2, the subject is generated and the event for obtaining the subject is generated. At the same time, the request for the subject from the receiving terminal 5 is totaled and resources necessary for providing the subject are allocated on the basis of the result of totaling. Then, the event is provided to the receiving terminal 5 and the subject is provided on the basis of the allocated resources. On the other hand, at the receiving terminal 5, the event is received and the necessity of the subject that can be obtained on the basis of the event is evaluated. On the basis of the result of evaluation, the request data requesting the subject is transmitted to the server 2. In accordance with the request for the subject of the request data, the subject provided from the server 2 is obtained on the basis of the event and the object is updated. Therefore, the subject used for updating the object needed at the receiving terminal 5 can be efficiently provided, and updating of the object can be efficiently carried out using the subject.

In the above-described case, update object information is provided from the server 2 of FIG. 1 to the mirror server 7 (and a server on the communication network 6, not shown) through the communication network 6 or a dedicated line. However, it is possible to cause the mirror server 7 to obtain the subject similarly to the receiving terminal 5 and provide the subject and the event for obtaining the subject to the receiving terminal 5.

Figure 17:
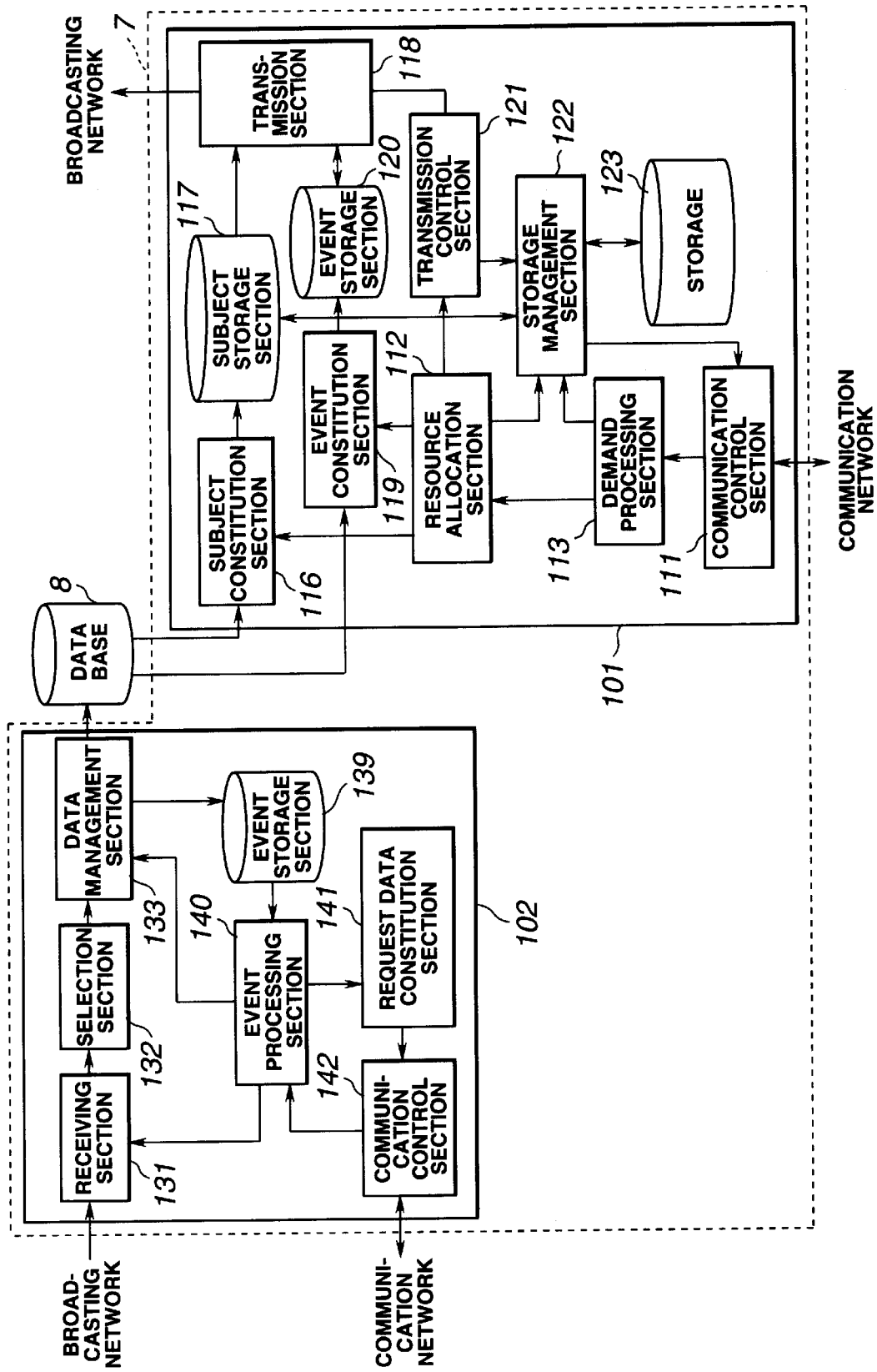
FIG. 17 is a block diagram showing an exemplary structure of a mirror server in the data distribution system.

Specifically, FIG. 17 shows an exemplary structure of such a mirror server 7.

In the embodiment of FIG. 17, the mirror server 7 is constituted by a transmission block 101 and a receiving block 102.

A communication control section 111, a resource allocation section 112, a demand processing section 113, a subject constitution section 116, a subject storage section 117, a transmission section 118, an event constitution section 119, an event storage section 120, a transmission control section 121, a storage management section 122, and a storage 123, which constitute the transmission block 101, correspond to the communication control section 11, the resource allocation section 12, the demand processing section 13, the subject constitution section 16, the subject storage section 17, the transmission section 18, the event constitution section 19, the event storage section 20, the transmission control section, the storage management section 22, and the storage 23, respectively, which constitute the server 2 of FIG. 5. A receiving section 131, a selection section 132, a data management section 133, an event storage section 139, an event processing section 140, a request data constitution section 141, and a communication control section 142, which constitute the receiving block 102, correspond to the receiving section 31, the selection section 32, the data management section 33, the event storage section 39, the event processing section 40, the request data constitution section 41, and the communication control section 42, respectively, which constitute the receiving terminal 5 of FIG. 14.

In the receiving block 102, processing similar to the case of the receiving terminal 5 (the above-described receiving processing, event processing or the like) is carried out, thus updating the database 8. However, selection of the event or subject by the selection section 132 is carried out on the basis of the demand for the update target object obtained by the demand processing section 113. Specifically, the selection section 132 evaluates the necessity of the subject corresponding to each object from the request data to the mirror server 7, and selects only the subject for which many requests are sent to the mirror server 7 on the basis of the result of evaluation. Consequently, only the object to be updated by such a subject is registered to the database 8, and the subject constitution section 116 or the event constitution section 119 of the transmission block 102 constitutes the subject or event only with respect to such an object.

In FIG. 17, the output of the receiving section 131 can be supplied directly to the data management section 133 without carrying out the above-described selection by the selection section 132.

The data distribution system to which the present invention is applied is described above. Such a data distribution system is useful particularly in the case where data is to be distributed to a number of databases constituting distributed databases, the case where data is to be distributed by IP multicast, and the case where data is to be distributed to a number of unspecified parties. In the embodiment, the event is transmitted through the broadcasting network 4. However, the event may be transmitted through the communication network 6, for example, in response to the request from the receiving terminal 5. Moreover, in the present invention, it is not essential to provide both the broadcasting network 4 and the communication network 6. That is, the present invention can be applied to a system having a network at least capable of bidirectional communication.

In the embodiment, the IP address of the server 2 or the mirror server 7 is arranged as the server access information. However, the telephone number or the like for access to the server 2 or the mirror server 7 can also be arranged as the server access information.

Moreover, in the embodiment, the updated object itself is arranged as the update object information included in the subject. However, data for reflecting the contents of change to the updated object onto the object before update (for example, a computer program of an execution format for changing the object before update to the updated object, or the difference between the updated object and the object before update) can also be arranged as the update object information.

What is claimed is:

1. A communication system comprising:
 a contents providing device for providing a contents signal;
 a plurality of contents receiving devices for receiving the contents signal provided from the contents providing device; and
 a database in which a plurality of contents signals are registered,
 the contents providing device having:
  receiving means for receiving request signals transmitted from the plurality of contents receiving devices,
  totaling means for totaling the request signals received by the receiving means,
  resource allocation means for allocating a resource for providing the contents signal on the basis of the result of totaling by the totaling means,
  contents providing means for providing the contents signal to the plurality of contents receiving devices on the basis of the resource allocated by the resource allocation means,
  event signal generation means for generating an event signal indicating the provision of the contents signal,
  event signal transmission means for transmitting the event signal to the plurality of contents receiving devices, and
  update signal generation means for generating an update signal for updating, in the plurality of contents receiving devices, the same contents signal as an updated contents signal registered in the database when it is updated, the event signal generation means generating a signal indicating the provision of the update signal as the event signal, the resource allocation means allocating a resource for providing the update signal as the contents signal, the contents providing means providing the update signal as the contents signal, and the plurality of contents receiving devices each comprising:

request signal generation means for evaluating the necessity of the contents signal and generating a request signal for receiving the contents signal on the basis of the result of evaluation, request signal transmission means for transmitting the request signal to the contents providing device, contents obtaining means for obtaining the contents signal provided by the contents providing means of the contents providing device, event signal receiving means for receiving the event signal, the request signal generation means evaluating the necessity of the contents signal on the basis of the event signal, storage means for storing the contents signal, and update means for updating the contents signal stored in the storage means on the basis of the update signal, the contents obtaining means obtaining the update signal on the basis of the event signal, the contents obtaining means supplying the update signal to the update means.

2. The communication system as claimed in claim 1, wherein the resource allocation means allocates a transmission band in a multiple-address network as a resource of the update signal, and the contents providing means transmits the update signal through the multiple-address network.

3. A communication system comprising a contents providing device for providing a contents signal and a plurality of contents receiving devices for receiving the contents signal provided from the contents providing device, the contents providing device comprising receiving means for receiving request signals transmitted from the plurality of contents receiving devices, totaling means for totaling the request signals received by the receiving means, resource allocation means for allocating a resource for providing the contents signal on the basis of the result of totaling by the totaling means, and contents providing means for providing the contents signal to the plurality of contents receiving devices on the basis of the resource allocated by the resource allocation means, the contents receiving device comprising request signal generation means for evaluating the necessity of the contents signal and generating a request signal for receiving the contents signal on the basis of the result of evaluation, request signal transmission means for transmitting the request signal to the content providing device, and contents obtaining means for obtaining the contents signal provided by the contents providing means of the contents providing device, wherein the contents providing means provides the contents signal through one of the multiple-address network and a bidirectional network, and wherein the request signal includes one of first information requesting the provision of the contents signal by the contents providing means using the multiple-address network and second information requesting the provision of the contents signal by the contents providing means using the bidirectional network.

4. The communication system as claimed in claim 3, wherein the totaling means carries out different totaling in accordance with whether the request signal includes the first information or the second information.

5. The communication system as claimed in claim 4, wherein the first information includes degree of request information indicating the degree of request for the contents signal.

6. The communication system as claimed in claim 5, wherein the totaling means allocates the resource on the basis of the number of times the first information is received and the degree of request.

* * * * *